(12) United States Patent
Nakaya et al.

(10) Patent No.: US 10,307,997 B2
(45) Date of Patent: Jun. 4, 2019

(54) LAMINATE FILM, METHOD FOR MANUFACTURING SAME, AND MELAMINE DECORATIVE PANEL

(71) Applicant: Mitsubishi Chemical Corporation, Tokyo (JP)

(72) Inventors: Fuminori Nakaya, Tokyo (JP); Junichi Abe, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 38 days.

(21) Appl. No.: 15/524,020

(22) PCT Filed: Oct. 27, 2015

(86) PCT No.: PCT/JP2015/080257
§ 371 (c)(1),
(2) Date: May 3, 2017

(87) PCT Pub. No.: WO2016/072321
PCT Pub. Date: May 12, 2016

(65) Prior Publication Data
US 2017/0326846 A1 Nov. 16, 2017

(30) Foreign Application Priority Data
Nov. 4, 2014 (JP) .................. 2014-223955

(51) Int. Cl.
| | |
|---|---|
| B32B 27/08 | (2006.01) |
| B32B 27/42 | (2006.01) |
| B32B 27/30 | (2006.01) |
| B32B 37/18 | (2006.01) |
| E04F 13/18 | (2006.01) |
| E04F 13/08 | (2006.01) |
| B05D 7/02 | (2006.01) |
| B05D 7/24 | (2006.01) |
| B29C 47/06 | (2006.01) |
| C08K 5/17 | (2006.01) |
| C08L 33/06 | (2006.01) |
| C08L 51/06 | (2006.01) |
| C08L 101/00 | (2006.01) |

(52) U.S. Cl.
CPC ............... *B32B 27/08* (2013.01); *B05D 7/02* (2013.01); *B05D 7/24* (2013.01); *B29C 47/06* (2013.01); *B32B 27/304* (2013.01); *B32B 27/308* (2013.01); *B32B 27/42* (2013.01); *B32B 37/18* (2013.01); *C08K 5/17* (2013.01); *C08L 33/06* (2013.01); *C08L 51/06* (2013.01); *C08L 101/00* (2013.01); *E04F 13/0885* (2013.01); *E04F 13/18* (2013.01); *B32B 2250/24* (2013.01); *B32B 2264/025* (2013.01); *B32B 2270/00* (2013.01); *B32B 2307/536* (2013.01); *B32B 2307/584* (2013.01); *B32B 2307/71* (2013.01); *B32B 2307/714* (2013.01); *B32B 2307/7265* (2013.01); *B32B 2307/734* (2013.01); *B32B 2398/10* (2013.01); *B32B 2405/00* (2013.01); *B32B 2419/00* (2013.01); *B32B 2451/00* (2013.01)

(58) Field of Classification Search
CPC ....... B32B 27/08; B32B 27/308; B32B 27/42; B32B 37/18; B32B 27/304; B32B 2250/24; B32B 2398/10; B32B 2419/00; B32B 2307/7265; E04F 13/0885; E04F 13/18
See application file for complete search history.

(56) References Cited

U.S. PATENT DOCUMENTS

| | | | |
|---|---|---|---|
| 2009/0142562 A1 | 6/2009 | Miyagawa et al. | |
| 2010/0189983 A1 | 7/2010 | Numrich et al. | |
| 2017/0197391 A1 | 7/2017 | Parusel et al. | |

FOREIGN PATENT DOCUMENTS

| | | | |
|---|---|---|---|
| CA | 766 732 A | * | 9/1967 |
| CA | 766732 A | | 9/1967 |
| JP | S62-156951 A | | 7/1987 |
| JP | H06-206389 A | | 7/1994 |
| JP | H06-306197 A | | 11/1994 |
| JP | H10-95885 A | | 4/1998 |
| JP | H11-268187 A | | 10/1999 |
| JP | 3339102 B2 | | 10/2002 |
| JP | 2007-506574 A | | 3/2007 |
| JP | 2010-131782 A | | 6/2010 |
| JP | 2010-235710 A | | 10/2010 |
| WO | 2005/040273 A1 | | 5/2005 |
| WO | 2013/141334 A1 | | 9/2013 |

OTHER PUBLICATIONS

Extended European Search Report issued in counterpart European Patent Application 15856883.2 dated Oct. 25, 2017.
International Search Report issued in corresponding International Patent Application No. PCT/JP2015/080257 dated Jan. 19, 2016.
(Continued)

Primary Examiner — Robert D. Harlan
(74) Attorney, Agent, or Firm — Morgan, Lewis & Bockius LLP

(57) ABSTRACT

Provided is a laminate film having excellent bonding properties, resistance to water whitening, and chemical resistance, and containing a fluororesin layer comprising a fluororesin composition, and an acrylic resin layer comprising a resin composition that contains a reactive group-containing acrylic resin, acrylic rubber particles, and a thermoplastic resin.

30 Claims, No Drawings

(56) References Cited

OTHER PUBLICATIONS

COATAX Toryo-yo Acrylic Jushi, Toray Fine Chemicals Co., Ltd., <http://www.torayfinechemicals.com/products/pdf/spe_cot.pdf> (Feb. 12, 2015) (see partial English translation).
Office Action issued in corresponding Japanese Patent Application No. 2015-556293 dated Jan. 17, 2017.
Notice of Observations by a Third Party issued in counterpart European Patent Application 15856883.2 dated Oct. 17, 2018.

* cited by examiner

LAMINATE FILM, METHOD FOR MANUFACTURING SAME, AND MELAMINE DECORATIVE PANEL

TECHNICAL FIELD

The present invention relates to a laminate film, a method for manufacturing the same, and a melamine decorative panel.

BACKGROUND ART

Acrylic resin films are excellent in transparency and weather resistance and also have high surface hardness. Thus, for example, the acrylic resin films are bonded to various molded articles for indoor or outdoor use application such as optical components of electronic products, interior components of automobiles, signboards, and building materials, and are suitably used as films for protecting the surfaces. In addition, by subjecting the surfaces of the acrylic resin films to surface treatment such as antireflection treatment or antifouling treatment and then bonding the surface-treated acrylic resin films to molded articles, it is also possible to provide surface performance such as antireflection property or antifouling property to the molded articles.

In a case where these acrylic resin films for bonding are bonded to base materials which are poor in adhesiveness with acrylic resins, when an adhesive, a primer, or the like is used, the number of processes and time and effort are increased, which is not advantageous in terms of costs. For this reason, acrylic resin films to which adhesiveness is provided, for example, by introducing a reactive substituent to the acrylic resin films have been developed.

For example, Patent Literature 1 discloses a film which contains a polymer containing a monomer having a reactive substituent as a copolymer component and is excellent in adhesiveness. In addition, Patent Literature 2 discloses a laminate film which is formed by a fluororesin and a polymer having a hydroxyl group.

CITATION LIST

Patent Literature

Patent Literature 1: JP 2007-506574 A
Patent Literature 2: JP 2010-131782 A

SUMMARY OF THE INVENTION

Problem to be Solved by the Invention

However, in a case where the reactive substituent is introduced in order to provide adhesiveness with the base material, the water whitening resistance and the appearance of the acrylic resin film are not sufficient in some cases. In addition, when the water whitening resistance and the appearance are intended to be improved, adhesiveness is not sufficient in some cases. In this regard, an object of the invention is to provide a laminate film which is excellent in bondability, water whitening resistance, chemical resistance, and appearance.

Means for Solving Problem

The present inventors have conducted intensive studies, and as a result, have found that the above-described object can be achieved by combining a fluororesin layer containing a fluororesin and an acrylic resin layer having a specific composition, and the invention has been completed accordingly. That is, the invention is shown as described in the following [1] to [18].

[1] A laminate film including:
a fluororesin layer (I) which is formed from a fluororesin composition (A); and
an acrylic resin layer (II) which is formed from a resin composition (B) containing a reactive group-containing acrylic resin (B-1), in which
the resin composition (B) contains 10 to 100% by mass of (B-1), 0 to 90% by mass of acrylic rubber particles (B-2) other than (B-1), and 0 to 90% by mass of a thermoplastic resin (B-3) having a mass average molecular weight of less than 400,000 other than (B-1) and (B-2) with respect to the total 100% by mass of (B-1), (B-2), and (B-3), and further contains 0 to 50 parts by mass of an additive (C) other than (B-1), (B-2), and (B-3) with respect to the total 100 parts by mass of (B-1), (B-2), and (B-3),
the reactive group-containing acrylic resin (B-1) contains a monomer unit having a reactive substituent with respect to an amino group or methylol group, and
a content of the monomer unit having a reactive substituent is 4% by mass or more with respect to 100% by mass of the resin composition (B).

[2] The laminate film described in [1], in which the reactive substituent is a hydroxyl group.

[3] The laminate film described in [1], in which the reactive substituent is a secondary hydroxyl group.

[4] The laminate film described in [1], in which the reactive group-containing acrylic resin (B-1) contains a monomer unit having a hydroxyl group, and
a hydroxyl value of the resin composition (B) is 15 to 300 mgKOH/g.

[5] The laminate film described in any one of [1] to [4], in which a glass transition temperature of the reactive group-containing acrylic resin (B-1) is 0 to 90° C.

[6] The laminate film described in any one of [1] to [5], in which a content of an aromatic vinyl monomer unit in the reactive group-containing acrylic resin (B-1) is 0 to 3% by mass with respect to 100% by mass of the reactive group-containing acrylic resin (B-1).

[7] The laminate film described in any one of [1] to [6], in which the resin composition (B) contains 10 to 90% by mass of (B-1), 10 to 90% by mass of (B-2), and 0 to 80% by mass of (B-3) with respect to the total 100% by mass of (B-1), (B-2), and (B-3).

[8] The laminate film described in any one of [1] to [7], in which a gel fraction of the resin composition (B) is 0 to 80%.

[9] The laminate film described in any one of [1] to [8], in which the additive (C) contains a hindered amine-based stabilizer having a molecular weight of 1,000 or more.

[10] The laminate film described in any one of [1] to [9], in which the fluororesin composition (A) contains polyvinylidene fluoride.

[11] The laminate film described in any one of [1] to [10], in which a thickness of the laminate film is 100 μm or less.

[12] The laminate film described in any one of [1] to [11], in which a thickness of the fluororesin layer (I) is 30 μm or less.

[13] The laminate film described in any one of [1] to [12], in which a fracture elongation of the laminate film is 5% or more.

[14] A method for manufacturing the laminate film described in any one of [1] to [13], including manufacturing the laminate film by a co-extrusion method.

[15] A method for manufacturing the laminate film described in any one of [1] to [13], including manufacturing the laminate film by a coating method.

[16] A protection film including the laminate film described in any one of [1] to [13].

[17] A melamine decorative panel surface protection film including the laminate film described in any one of [1] to [13].

[18] A melamine decorative panel including the laminate film described in any one of [1] to [13] and a melamine base material laminated in order of the fluororesin layer (I), the acrylic resin layer (II), and the melamine base material.

Effect of the Invention

According to the invention, it is possible to provide a laminate film which is excellent in bondability, water whitening resistance, chemical resistance, and appearance.

MODE(S) FOR CARRYING OUT THE INVENTION

[Laminate Film]

A laminate film according to the invention includes a fluororesin layer (I) which is formed from a fluororesin composition (A) containing a fluororesin and an acrylic resin layer (II) which is formed from a resin composition (B) containing a reactive group-containing acrylic resin (B-1). Herein, the reactive group-containing acrylic resin (B-1) contained in the resin composition (B) forming the acrylic resin layer (II) has a reactive substituent for exhibiting adhesiveness with a base material. For this reason, in the case of use application of bonding the laminate film according to invention, it is preferable that the acrylic resin layer (II) formed from the resin composition (B) is used as a bonding layer while facing an adherend side and the fluororesin layer (I) formed from the fluororesin composition (A) is used as a surface layer while opposing to the adherend.

[Fluororesin Composition (A)]

First, the fluororesin composition (A) forming the fluororesin layer (I) will be described. The fluororesin composition (A) can contain, for example, a fluororesin (A-1), a thermoplastic polymer (A-2), and an additive (C). It is preferable that the fluororesin composition (A) contains 50 to 100% by mass of (A-1) and 0 to 50% by mass of (A-2) with respect to the total 100% by mass of (A-1) and (A-2), and further contains 0 to 20 parts by mass of the additive (C) with respect to the total 100 parts by mass of (A-1) and (A-2).

When the content of the fluororesin (A-1) is 50% by mass or more, chemical resistance is provided to the fluororesin layer (I) so that chemical resistance of the laminate film and a molded article obtained by laminating the laminate film becomes favorable. When the content of the thermoplastic polymer (A-2) is 50% by mass or less, chemical resistance is provided to the fluororesin layer (I) so that chemical resistance of the laminate film and the molded article obtained by laminating the laminate film becomes favorable.

From the viewpoint of chemical resistance, it is preferable that the content of the fluororesin (A-1) is higher. On the other hand, in a case where a crystalline polymer such as polyvinylidene fluoride is used in (A-1), there is a possibility that curling occurs in the laminate film due to crystallization shrinkage or a difference in thermal shrinkage rate with the acrylic resin layer (II) and handleability is decreased. In this case, by adding (A-2), curling is suppressed so that handleability of the laminate film can be made favorable. From the viewpoint of curling suppression, it is preferable that the content of (A-2) is higher. In addition, in a case where a relatively soft resin such as polyvinylidene fluoride is used in (A-1) and a relatively hard resin such as polymethyl methacrylate is used in (A-2), by adding (A-2), the surface hardness is increased to improve scratch resistance. From the viewpoint of scratch resistance, it is preferable that the content of (A-2) is higher. Further, in a case where a crystalline polymer such as polyvinylidene fluoride is used in (A-1), there is a possibility that a decrease in optical characteristics, such as a decrease in film transparency, an increase in haze value, and an increase in yellowness index occurs. In this case, by adding (A-2), crystallinity is lowered or the crystal size is finely decreased so that the optical characteristics can be improved.

From the viewpoint of chemical resistance, the fluororesin composition (A) more preferably contains 70 to 100% by mass of (A-1) and 0 to 30% by mass of (A-2) with respect to the total 100% by mass of (A-1) and (A-2).

From the viewpoint of curling suppression, the fluororesin composition (A) more preferably contains 50 to 95% by mass of (A-1) and 5 to 50% by mass of (A-2) with respect to the total 100% by mass of (A-1) and (A-2), and further preferably contains 50 to 85% by mass of (A-1) and 15 to 50% by mass of (A-2). When the content of (A-2) is 5% by mass or more, curling is suppressed to make the handleability of the laminate film favorable.

From the viewpoint of scratch resistance, the fluororesin composition (A) more preferably contains 50 to 90% by mass of (A-1) and 10 to 50% by mass of (A-2) with respect to the total 100% by mass of (A-1) and (A-2), and further preferably contains 50 to 75% by mass of (A-1) and 25 to 50% by mass of (A-2).

Further, the fluororesin composition (A) more preferably contains 0 to 10 parts by mass of the additive (C) and further preferably 0 to 3 parts by mass of the additive (C) with respect to the total 100 parts by mass of (A-1) and (A-2). Incidentally, the fluororesin composition (A) may not contain the thermoplastic polymer (A-2) and the additive (C).

[Fluororesin (A-1)]

The fluororesin (A-1) is not particularly limited as long as it is a homopolymer or copolymer of a monomer having a fluorine substituent, and may contain a non-fluoropolymer such as ethylene.

Examples of the monomer having a fluorine substituent include perfluoroalkyl vinyl ether such as vinyl fluoride, vinylidene fluoride, trifluoroethylene, chlorotrifluoroethylene, 1,2-difluoroethylene, tetrafluoroethylene, hexafluoropropylene, perfluoro(methyl vinyl ether), perfluoro(ethyl vinyl ether), or perfluoro(propyl vinyl ether); fluoroalkyl methacrylate such as perfluoro(1,3-dioxole), perfluoro(2,2-dimethyl-1,3-dioxole), perfluorobutylethylene, 3,3,3-trifluoropropene, or trifluoroethyl methacrylate; and fluoroalkyl acrylate such as trifluoroethyl acrylate. They may be used either singly or in combination of two or more kinds.

From the viewpoint of chemical resistance and availability, the fluororesin (A-1) is preferably a homopolymer or copolymer of vinylidene fluoride and more preferably a vinylidene fluoride homopolymer that is polyvinylidene fluoride. Specific examples thereof include "KYNAR 720" (trade name, manufactured by Arkema Inc.), "KYNAR 740" (trade name, manufactured by Arkema Inc.), "KF Polymer T#850" (trade name, manufactured by KUREHA CORPO- RATION), "KF Polymer T#1000" (trade name, manufactured by KUREHA CORPORATION), and "KF Polymer T#1100" (trade name, manufactured by KUREHA CORPORATION). All of those examples are a vinylidene fluoride homopolymer. They may be used either singly or in combination of two or more kinds.

From the viewpoint of easiness in melt molding, a melt flow rate (MFR) of the fluororesin (A-1) as measured at 230° C. and 5 kg according to ASTM D1238 is preferably 5 to 50 g/10 min and more preferably 10 to 30 g/10 min. As the fluororesin (A-1) satisfying the range of MFR, specifically, "KYNAR 720" (trade name, manufactured by Arkema Inc.) and "KF Polymer T#850" (trade name, manufactured by KUREHA CORPORATION) are mentioned.

The mass average molecular weight of the fluororesin (A-1) is preferably 100,000 to 500,000. Incidentally, the mass average molecular weight is a value measured in a dimethyl formamide solution by a method to be described later.

[Thermoplastic Polymer (A-2)]

The thermoplastic polymer (A-2) is a thermoplastic polymer other than the fluororesin (A-1) and is preferably a polymer obtained by polymerizing a monomer containing methacrylic acid alkyl ester as a main component. The thermoplastic polymer (A-2) is more preferably a polymer obtained by polymerizing methacrylic acid alkyl ester, acrylic acid alkyl ester, and a monomer other than (meth) acrylic acid alkyl ester. For example, as the thermoplastic polymer (A-2), it is possible to use a polymer obtained by polymerizing a monomer containing 50 to 99.9% by mass of methacrylic acid alkyl ester having an alkyl group with 1 to 4 carbon atoms, 0.1 to 50% by mass of acrylic acid alkyl ester, and 0 to 49.9% by mass of a monomer other than (meth)acrylic acid alkyl ester (100% by mass in total). Incidentally, (meth)acrylic acid represents either acrylic acid or methacrylic acid.

Examples of the methacrylic acid alkyl ester include methyl methacrylate, ethyl methacrylate, and butyl methacrylate. Among these, methyl methacrylate is preferable. They may be used either singly or in combination of two or more kinds.

Examples of the acrylic acid alkyl ester include methyl acrylate, ethyl acrylate, and butyl acrylate. They may be used either singly or in combination of two or more kinds.

Examples of the monomer other than (meth)acrylic acid alkyl ester include an aromatic vinyl monomer such as styrene, a vinyl cyanide monomer such as acrylonitrile, an unsaturated dicarboxylic anhydride such as maleic anhydride or itaconic anhydride, N-phenylmaleimide, and N-cyclohexylmaleimide. They may be used either singly or in combination of two or more kinds.

A method for producing the thermoplastic polymer (A-2) is not particularly limited, and for example, various polymerization methods such as suspension polymerization, emulsion polymerization, and bulk polymerization can be used. A chain transfer agent, another polymerization aid, and the like may be used at the time of polymerization. The chain transfer agent is not particularly limited, but is preferably mercaptans.

The mass average molecular weight of the thermoplastic polymer (A-2) is preferably less than 400,000 from the viewpoint of occurring an appropriate elongation at the time of melting a film raw material resin and having favorable film formability. In addition, the mass average molecular weight thereof is preferably 10,000 or more from the viewpoint that cutting of the film is less likely to occur at the time of film formation and film handling in order not to make the film brittle. Incidentally, the mass average molecular weight is a value measured by a method to be described later.

[Additive (C)]

The additive (C) is a compound other than the fluororesin (A-1) and the thermoplastic polymer (A-2), and examples thereof include a stabilizer, a lubricant, a processing aid, a plasticizer, an impact resistance improver, a foaming agent, a filler, a colorant, and an ultraviolet absorbing agent.

Among these, as the additive (C), from the viewpoint of securing the film formability, a processing aid is preferable. The processing aid is not particularly limited, but a processing aid formed from a thermoplastic polymer other than (A-2) is preferable and a polymer obtained by polymerizing methyl methacrylate and a monomer other than methyl methacrylate is more preferable.

As the processing aid, for example, a polymer obtained by polymerizing 50 to 100% by mass of methyl methacrylate and 0 to 50% by mass of a monomer other than methyl methacrylate (100% by mass in total) can be used. Since the film formability is improved by using the processing aid, the processing aid is particularly effective in a case where thickness accuracy or film formation speed needs to be at a high level.

The mass average molecular weight of the processing aid formed from a thermoplastic polymer is, from the viewpoint of obtaining a film with favorable thickness accuracy, preferably 400,000 or more, more preferably 500,000 to 5,000,000, and further preferably 700,000 to 2,000,000. Incidentally, the mass average molecular weight is a value obtained by a method to be described later.

Examples of the monomer other than methyl methacrylate include acrylic acid alkyl ester, methacrylic acid alkyl ester other than methyl methacrylate, an aromatic vinyl monomer, and a vinyl cyanide monomer. They may be used either singly or in combination of two or more kinds.

As a method for producing the processing aid formed from a thermoplastic polymer, an emulsion polymerization method is preferable. The processing aid formed from a thermoplastic polymer can be obtained, for example, by separating and recovering a polymer latex, which is produced by an emulsion polymerization method, with various coagulating agents, or separating and recovering a solid content by spray drying.

The used amount of the processing aid is preferably 0 to 20 parts by mass with respect to the total 100 parts by mass of the fluororesin (A-1) and the thermoplastic polymer (A-2). When the used amount thereof is 20 parts by mass or less, the viscosity of the fluororesin composition (A) becomes suitable so as to obtain favorable film formability.

From the viewpoint of providing weather resistance in order to protect the base material, the additive (C) is preferably an ultraviolet absorbing agent. The molecular weight of the ultraviolet absorbing agent is preferably 300 or more and more preferably 400 or more. In a case where the molecular weight thereof is 300 or more, the ultraviolet absorbing agent is less likely to volatile when vacuum molding or pressure molding is performed in an injection molding mold, and the mold is less likely to be contaminated. The type of the ultraviolet absorbing agent is not particularly limited, but a benzotriazole-based ultraviolet absorbing agent having a molecular weight of 400 or more and a triazine-based ultraviolet absorbing agent having a molecular weight of 400 or more are preferable. Examples of a commercially available product as the benzotriazole-based ultraviolet absorbing agent having a molecular weight of 400 or more include "Tinuvin 234" (trade name, manufactured by Ciba-Geigy) and "ADK STAB LA-31" (trade name, manufactured by ADEKA CORPORATION). Examples of a commercially available product as the triazine-based ultraviolet absorbing agent having a molecular weight of 400 or more include "Tinuvin 1577" (trade name, manufactured by Ciba-Geigy). They may be used either singly or in combination of two or more kinds. The added amount of the ultraviolet absorbing agent is preferably 0 to 20 parts by mass and more preferably 0 to 5 parts by mass with respect to the total 100 parts by mass of the fluororesin (A-1) and the thermoplastic polymer (A-2) from the viewpoint of weather resistance. When the ultraviolet absorbing agent is added, weather resistance becomes favorable, but in a case where the compatibility of the ultraviolet absorbing agent with the fluororesin (A-1) and the thermoplastic resin (A-2) is poor, appearance may become poor, and thus the ultraviolet absorbing agent may not be added.

In addition, from the viewpoint of further improving weather resistance, a radical scavenger such as a hindered amine-based stabilizer is preferably used as the additive (C) together with the ultraviolet absorbing agent. Examples of a commercially available product as the radical scavenger include "Chimassorb 2020" (trade name, manufactured by BASF); "ADK STAB LA-57", "ADK STAB LA-62", "ADK STAB LA-67", "ADK STAB LA-63", and "ADK STAB LA-68" (all trade names, manufactured by ADEKA CORPORATION); and "SANOL LS-770", "SANOL LS-765", "SANOL LS-292", "SANOL LS-2626", "SANOL LS-1114", and "SANOL LS-744" (all trade name, manufactured by Sankyo Life Tech Co., Ltd.). They may be used either singly or in combination of two or more kinds. The added amount of the radical scavenger is preferably 0 to 10 parts by mass and more preferably 0 to 5 parts by mass with respect to the total 100 parts by mass of the fluororesin (A-1) and the thermoplastic polymer (A-2) from the viewpoint of bleeding-out resistance. When the radical scavenger is added, weather resistance becomes favorable, but in a case where the compatibility of the radical scavenger with the fluororesin (A-1) and the thermoplastic resin (A-2) is poor, appearance may become poor. In addition, the fluororesin (A-1) may be colored by reaction with the hindered amine-based stabilizer. From these viewpoints, the radical scavenger may not be added.

[Resin Composition (B)]

Next, the resin composition (B) forming the acrylic resin layer (II) will be described. The resin composition (B) is expressed by the following (1) or (2).

(1): The resin composition (B) contains, with respect to the total 100% by mass of the reactive group-containing acrylic resin (B-1), the acrylic rubber particles (B-2) other than (B-1), and the thermoplastic resin (B-3) having a mass average molecular weight of less than 400,000 other than (B-1) and (B-2), 10 to 100% by mass of (B-1), 0 to 90% by mass of (B-2), and 0 to 90% by mass of (B-3) and further contains 0 to 50 parts by mass of the additive (C) other than (B-1), (B-2), and (B-3) with respect to the total 100 parts by mass of (B-1), (B-2), and (B-3), the reactive group-containing acrylic resin (B-1) contains a monomer unit having a reactive substituent with respect to an amino group or methylol group, and the content of the monomer unit having a reactive substituent is 4% by mass or more with respect to 100% by mass of the resin composition (B).

(2): The resin composition (B) contains, with respect to the total 100% by mass of the reactive group-containing acrylic resin (B-1), the acrylic rubber particles (B-2) other than (B-1), and the thermoplastic resin (B-3) having a mass average molecular weight of less than 400,000 other than (B-1) and (B-2), 10 to 100% by mass of (B-1), 0 to 90% by mass of (B-2), and 0 to 90% by mass of (B-3) and further contains 0 to 50 parts by mass of the additive (C) other than (B-1), (B-2), and (B-3) with respect to the total 100 parts by mass of (B-1), (B-2), and (B-3), the reactive group-containing acrylic resin (B-1) contains a monomer unit having a hydroxyl group, and the hydroxyl value of the resin composition (B) is 15 to 300 mgKOH/g.

In the above (1) and (2), from the viewpoint of adhesiveness, film handleability, and scratch resistance, the resin composition (B) preferably contains 10 to 90% by mass of (B-1), 10 to 90% by mass of (B-2), and 0 to 80% by mass of (B-3) and more preferably contains 20 to 90% by mass of (B-1), 10 to 80% by mass of (B-2), and 0 to 70% by mass of (B-3), further preferably contains 40 to 90% by mass of (B-1), 10 to 60% by mass of (B-2), and 0 to 50% by mass of (B-3), and particularly preferably contains 50 to 90% by mass of (B-1), 10 to 50% by mass of (B-2), and 0 to 40% by mass of (B-3) with respect to the total 100% by mass of (B-1), (B-2), and (B-3).

From the viewpoint of adhesiveness, it is preferable to contain a larger amount of (B-1) and (B-2). As the content of (B-1) is increased, the content of the reactive substituent with respect to an amino group or methylol group is increased so as to improve adhesiveness. In addition, as the content of (B-2) is increased, breakage inside the acrylic resin layer (II) is suppressed so as to improve adhesiveness. From the viewpoint of film handleability, it is preferable to contain a larger amount of (B-2). As the content of (B-2) is increased, the toughness of the acrylic resin layer (II) is improved so as to make the handleability of the laminate film favorable. From the viewpoint of scratch resistance, it is preferable to contain a smaller amount of (B-2). As the content of (B-2) is decreased, pencil hardness is increased so as to improve scratch resistance.

In addition, the resin composition (B) contains preferably 0 to 10 parts by mass, more preferably 0.1 to 5 parts by mass, and further preferably 0.1 to 3 parts by mass of the additive (C) with respect to the total 100 parts by mass of (B-1), (B-2), and (B-3).

Incidentally, the resin composition (B) may not contain the acrylic rubber particles (B-2), the thermoplastic resin (B-3), and the additive (C).

In the above (1), the reactive group-containing acrylic resin (B-1) contains a monomer unit having a reactive substituent with respect to an amino group or methylol group, and the content thereof is 4% by mass or more with respect to 100% by mass of the resin composition (B). When the monomer unit having a reactive substituent is contained in 4% by mass or more, favorable adhesiveness is obtained. From the viewpoint of obtaining more favorable adhesiveness, the monomer unit having a reactive substituent is contained preferably in 5% by mass or more and more preferably in 10% by mass or more. The upper limit of the content of the monomer unit having a reactive substituent is not particularly limited, but can be set to 50% by mass or less. Incidentally, this content is a value calculated from the incorporated amount of the raw material.

In the above (2), the reactive group-containing acrylic resin (B-1) contains a monomer unit having a hydroxyl group, and the hydroxyl value of the resin composition (B) is 15 to 300 mgKOH/g. When the hydroxyl value is 15 mgKOH/g or more, favorable adhesiveness is obtained. When the hydroxyl value is 300 mgKOH/g or less, the water absorbability of the resin composition (B) is decreased and the water resistance of the laminate film and the melamine decorative panel having the laminate film laminated thereon is improved. From the viewpoint of adhesiveness and water resistance, the hydroxyl value is more preferably 20 to 120 mgKOH/g and further preferably 25 to 80 mgKOH/g. Incidentally, the hydroxyl value is a value calculated by a method to be described later. In addition, also in the above (1), it is preferable that the reactive group-containing acrylic resin (B-1) contains a monomer unit having a hydroxyl group and the hydroxyl value of the resin composition (B) is preferably 15 to 300 mgKOH/g. The hydroxyl value is more preferably 20 to 120 mgKOH/g and further preferably 25 to 80 mgKOH/g.

The gel fraction of the resin composition (B) is preferably 0 to 80%. As the gel fraction is increased, the toughness of the film is improved so that the handleability of the film and film formability are improved. In addition, as the gel fraction is decreased, generation of a thermally deteriorated foreign matter of the resin is suppressed so as to make film appearance favorable. From the viewpoint of film toughness, the gel fraction is more preferably 10 to 80% and further preferably 30 to 80%. In addition, from the viewpoint of film appearance, the gel fraction is more preferably 0 to 50% and further preferably 0 to 40%.

The glass transition temperature (Tg) of the reactive group-containing acrylic resin (B-1) is preferably 0 to 90° C., more preferably 15 to 80° C., further preferably 20 to 75° C., and particularly preferably 25 to 70° C. In a case where the Tg is 0° C. or higher, the adhesion of films at the time of manufacturing or handling can be prevented so as to make workability favorable. In addition, the heat resistance of the melamine decorative panel using the laminate film according to the invention is favorable. Further, in a case where the Tg is 90° C. or lower, the adhesiveness with the melamine base material becomes more favorable. Incidentally, the Tg can be obtained by using a numerical value of Tg of a homopolymer forming the reactive group-containing acrylic resin (B-1) according to the Fox equation. The Fox equation is described below.

$$1/(273+Tg) = \Sigma(w_i/(273+Tg_i))$$

In the equation, Tg is Tg (° C.) of a copolymer (or a mixture thereof), $w_i$ is a mass fraction of a monomer i, and $Tg_i$ is Tg (° C.) of a homopolymer obtained by polymerizing the monomer i.

Herein, as the numerical value of Tg of the homopolymer, a numerical value described in POLYMER HANDBOOK THIRD EDITION (WILEY INTERSCIENCE) or a catalog value of a monomer manufacturer is used. Incidentally, in a case where the monomer contains a crosslinkable monomer, Tg of the monomer excluding the crosslinkable monomer is obtained.

[Reactive Group-Containing Acrylic Resin (B-1)]

The reactive group-containing acrylic resin (B-1) is not particularly limited as long as it contains a monomer unit having a specific reactive substituent in the above (1) or (2). For example, the reactive group-containing acrylic resin (B-1) can contain a monomer unit having a reactive substituent, an aromatic vinyl monomer unit, and a monomer unit other than the monomer unit having a reactive substituent and the aromatic vinyl monomer unit. Specifically, the reactive group-containing acrylic resin (B-1) can contain 4 to 100% by mass of the monomer unit having a reactive substituent, 0 to 3% by mass of the aromatic vinyl monomer unit, and 0 to 96% by mass of the monomer unit other than the monomer unit having a reactive substituent and the aromatic vinyl monomer unit (100% by mass in total).

Since the reactive group-containing acrylic resin (B-1) contains the monomer unit having a reactive substituent with respect to an amino group or methylol group, such as a hydroxyl group, the reactive group-containing acrylic resin (B-1) can be attached to the melamine decorative panel by performing heat reaction in a state of being contacted with a material containing methylol melamine and a derivative thereof, specifically, a melamine resin or a precursor thereof of the melamine decorative panel.

Examples of the reactive substituent with respect to an amino group or methylol group include a hydroxyl group, a carboxyl group, an amino group, an amide group, an acid anhydride group, an imide group, and an epoxy group. The reactive group-containing acrylic resin (B-1) may have one kind of these reactive substituents or two or more kinds thereof. The reaction temperature of the reactive substituent varies depending on the presence of a catalyst, a pH value, or the like, but is preferably 50 to 200° C. and more preferably 110 to 170° C. Since the melamine decorative panel is produced generally at a temperature of 110 to 170° C., when the reaction temperature is 110 to 170° C., it is possible to sufficiently attach the laminate film according to the invention to the melamine base material at the same time of manufacturing the melamine decorative panel by laminating the laminate film according to the invention and the melamine base material and then heating them.

Examples of the monomer having a reactive substituent include a monomer having a hydroxyl group such as hydroxyalkyl (meth)acrylate; a monomer having a carboxyl group such as (meth)acrylic acid, (meth)acryloyloxy alkylcarboxylic acid, or (meth)acryloyloxy aromatic carboxylic acid; a monomer having an amino group such as aminoalkyl (meth)acrylate; a monomer having an amide group such as alkylamidealkyl (meth)acrylate; an acid anhydride monomer such as maleic anhydride; a maleimide monomer such as maleimide or alkylmaleimide; and an epoxy group-containing monomer such as glycidyl (meth)acrylate. They may be used either singly or in combination of two or more kinds. Among these, as the monomer having a reactive substituent, from the viewpoint of adhesiveness, a monomer having a hydroxyl group, a carboxyl group, an acid anhydride group, or an epoxy group as a reactive substituent is preferable. In addition, as the monomer having a reactive substituent, a monomer having a hydroxyl group, a carboxyl group, or an epoxy group as a reactive substituent is more preferable since the monomer does not have a hydrolyzable site such as acid anhydride and enables a polymer to be efficiently produced in aqueous polymerization such as emulsion polymerization or suspension polymerization. In addition, as the monomer having a reactive substituent, from the viewpoint of preventing crosslinking at the time of melt molding, a monomer having a hydroxyl group as a reactive substituent is further preferable. Moreover, as the monomer having a reactive substituent, from the viewpoint of particularly decreasing crosslinking at the time of melt molding, a monomer having a secondary hydroxyl group as a reactive substituent is particularly preferable.

As the monomer having a hydroxyl group as a reactive substituent, specifically, 2-hydroxyethyl methacrylate, 2-hydroxypropyl methacrylate, 2-hydroxy-1-methylethyl methacrylate, hydroxybutyl methacrylate, 2-hydroxyethyl acrylate, 2-hydroxypropyl acrylate, 2-hydroxy-1-methylethyl acrylate, and hydroxybutyl acrylate are preferable. In particular, in terms that it is possible to prevent film appearance from being poor due to the crosslinking reaction at the time of melt molding, as the monomer having a hydroxyl group as a reactive substituent, 2-hydroxypropyl methacrylate or 2-hydroxypropyl acrylate which has a secondary hydroxyl group is more preferable. Further, in terms that copolymerization property with other monomers such as methyl methacrylate becomes favorable, 2-hydroxypropyl methacrylate is particularly preferable. They may be used either singly or in combination of two or more kinds.

The used amount of the monomer having a reactive substituent is not particularly limited, but is preferably 4 to 100% by mass with respect to the reactive group-containing acrylic resin (B-1). In addition, from the viewpoint of adhesiveness and side reaction prevention, the used amount thereof is more preferably 4 to 80% by mass and particularly preferably 10 to 30% by mass. In a case where the used amount thereof is 4% by mass or more, adhesiveness becomes more favorable. Further, in a case where the used amount thereof is 80% by mass or less, when 20% by mass or more of a non-reactive monomer is concurrently used, side reaction caused by the reactive substituent can be suppressed. In addition, in a case where the monomer having a reactive substituent is soluble in water, when a water-insoluble monomer is concurrently used, it is possible to suppress dissolution to water so that a polymer is efficiently produced in aqueous polymerization such as emulsion polymerization or suspension polymerization.

The used amount of the aromatic vinyl monomer is preferably 0 to 3% by mass with respect to 100% by mass of the reactive group-containing acrylic resin (B-1). When the used amount thereof is 3% by mass or less, weather resistance of the laminate film and the melamine decorative panel to be obtained becomes favorable. The used amount thereof is more preferably 0 to 1% by mass and more preferably 0 to 0.1% by mass. Incidentally, the used amount thereof is preferably smaller, and may be 0% by mass.

As the monomer other than the monomer having a reactive substituent and the aromatic vinyl monomer, the same monomers as monomers used in polymerization of the thermoplastic polymer (A-2) can be used. However, from the viewpoint of compatibility with the acrylic rubber particles (B-2) and the thermoplastic resin (B-3) to be described later and adhesiveness with the fluororesin layer (I), an acrylic monomer, particularly, methyl methacrylate is preferable. The used amount of the monomer other than the monomer having a reactive substituent and the aromatic vinyl monomer is, from the viewpoint of suppressing reaction such as crosslinking by the reactive substituent, preferably 0 to 96% by mass and more preferably 20 to 96% by mass with respect to the reactive group-containing acrylic resin (B-1). Incidentally, the used amount may be 0% by mass.

A method for producing the reactive group-containing acrylic resin (B-1) is not particularly limited, and for example, various polymerization methods such as suspension polymerization, emulsion polymerization, bulk polymerization, and solution polymerization can be used. However, in a case where acid anhydride or a monomer having an imide structure is used as the monomer having a reactive substituent, hydrolysis occurs at the time of polymerization, the reactive group-containing acrylic resin (B-1) cannot be produced by aqueous polymerization such as suspension polymerization or emulsion polymerization. A chain transfer agent, another polymerization aid, and the like may be used at the time of polymerization. The chain transfer agent is not particularly limited, but is preferably mercaptans.

[Acrylic Rubber Particles (B-2)]

The acrylic rubber particles (B-2) are acrylic rubber particles other than the reactive group-containing acrylic resin (B-1), and are preferably acrylic rubber particles having a multi-layered structure of two or more layers in which a layer containing a rigid polymer (b-2) as an outer layer is formed on a layer containing an elastic copolymer (b-1) as an inner layer.

In particular, the acrylic rubber particles (B-2) are preferably acrylic rubber particles having a multi-layered structure of two or more layers in which a layer containing the rigid polymer (b-2) as an outer layer having a structure of one layer or two or more layers which is obtained by craft polymerization of a monomer having methacrylic acid alkyl ester as a main component is formed on a layer containing the elastic copolymer (b-1) as an inner layer having a structure of one layer or two or more layers which is obtained by using (meth)acrylic acid alkyl ester as a main component.

In addition, the acrylic rubber particles (B-2) may include one or more layers containing an intermediate polymer (b-3) between the layer containing the elastic copolymer (b-1) and the layer containing the rigid polymer (b-2).

The content of the elastic copolymer (b-1) in the acrylic rubber particles (B-2) is preferably 10 to 90% by mass and more preferably 20 to 70% by mass. The content of the rigid polymer (b-2) in the acrylic rubber particles (B-2) is preferably 10 to 90% by mass and more preferably 30 to 70% by mass. The content of the intermediate polymer (b-3) in the acrylic rubber particles (B-2) is preferably 0 to 35% by mass and more preferably 0 to 20% by mass. In a case where the content of the intermediate polymer (b-3) is 35% by mass or less, the balance of a final polymer is favorable.

The elastic copolymer (b-1) is preferably a polymer obtained by polymerizing a monomer composition containing (meth)acrylic acid alkyl ester. The elastic copolymer (b-1) is more preferably a polymer obtained by polymerizing a monomer composition containing acrylic acid alkyl ester.

The monomer composition may further contain a monomer other than (meth)acrylic acid alkyl ester and a crosslinkable monomer. For example, a monomer to be used in the elastic copolymer (b-1) can contain 80 to 100% by mass of acrylic acid alkyl ester having an alkyl group with 1 to 8 carbon atoms and methacrylic acid alkyl ester having an alkyl group with 1 to 4 carbon atoms, 0 to 20% by mass of a monomer other than (meth)acrylic acid alkyl ester, and 0 to 10% by mass of the crosslinkable monomer (100% by mass in total).

As the acrylic acid alkyl ester having an alkyl group with 1 to 8 carbon atoms, for example, methyl acrylate, ethyl acrylate, propyl acrylate, butyl acrylate, 2-ethylhexyl acrylate, and n-octyl acrylate are preferable, and acrylic acid alkyl ester having a low Tg is more preferable. They may be used either singly or in combination of two or more kinds.

The acrylic acid alkyl ester is used as a main component of a monomer forming the elastic copolymer (b-1). Specifically, the used amount of the acrylic acid alkyl ester is preferably 30 to 99.9% by mass with respect to the entire monomer forming the elastic copolymer (b-1). In a case where the used amount thereof is 30% by mass or more, formability of the film is favorable. The used amount thereof is more preferably 50 to 95% by mass.

In a case where the elastic copolymer (b-1) has a structure of two or more layers, the range of the used amount represents the used amount of the acrylic acid alkyl ester as a whole of the elastic copolymer (b-1). For example, in a case where the elastic copolymer (b-1) has a hard core structure, the used amount of acrylic acid alkyl ester in the first layer (core portion) can also be set to be less than 30% by mass.

Examples of methacrylic acid alkyl ester having an alkyl group with 1 to 4 carbon atoms include methyl methacrylate, ethyl methacrylate, propyl methacrylate, and butyl methacrylate. They may be used either singly or in combination of two or more kinds. The used amount of methacrylic acid alkyl ester is preferably 0 to 69.9% by mass and more preferably 0 to 40% by mass with respect to the entire monomer forming the elastic copolymer (b-1).

As the monomer other than (meth)acrylic acid alkyl ester, another vinyl monomer which is copolymerizable with the (meth)acrylic acid alkyl ester is mentioned. As the monomer other than (meth)acrylic acid alkyl ester, for example, styrene and acrylonitrile are mentioned. They may be used either singly or in combination of two or more kinds. In the case of using the monomer other than (meth)acrylic acid alkyl ester, the used amount thereof is preferably 0 to 69.9% by mass and more preferably 0 to 20% by mass with respect to the entire monomer forming the elastic copolymer (b-1).

Examples of the crosslinkable monomer include ethylene glycol dimethacrylate, 1,3-butylene glycol dimethacrylate, 1,4-butylene glycol dimethacrylate, propylene glycol dimethacrylate, and a graft linking agent. They may be used either singly or in combination of two or more kinds. The used amount of the crosslinkable monomer is preferably 0.1 to 10% by mass and more preferably 0.5 to 5% by mass with respect to the entire monomer forming the elastic copolymer (b-1). A graft linking agent is preferably used as a crosslinkable monomer in terms of stability of the acrylic rubber particles (B-2).

Examples of the graft linking agent include an allyl ester, methallyl ester, or crotyl ester of α,β-unsaturated carboxylic acid or unsaturated dicarboxylic acid; triallyl cyanurate, and triallyl isocyanurate. Among these, an allyl ester of acrylic acid, methacrylic acid, maleic acid, fumaric acid, or the like is preferable, and allyl methacrylate is more preferable since it has an excellent effect.

In such a graft linking agent, mainly, a conjugated unsaturated bond of its ester reacts quicker by far than an allyl group, a methallyl group, or a crotyl group to chemically bond. Then, most part of the allyl group, methallyl group, or crotyl group quickly reacting effectively acts during polymerization of the next layer polymer to provide a grafting bond between adjacent two layers.

The rigid polymer (b-2) is preferably a polymer obtained by polymerizing methacrylic acid alkyl ester, acrylic acid alkyl ester, and a monomer other than (meth)acrylic acid alkyl ester. For example, the rigid polymer (b-2) is obtained by polymerizing a monomer formed from 51 to 100% by mass of methacrylic acid alkyl ester having an alkyl group with 1 to 4 carbon atoms, and 0 to 49% by mass of acrylic acid alkyl ester having an alkyl group with 1 to 8 carbon atoms or a monomer other than (meth)acrylic acid alkyl ester in the presence of the elastic copolymer (b-1). As methacrylic acid alkyl ester having an alkyl group with 1 to 4 carbon atoms, acrylic acid alkyl ester having an alkyl group with 1 to 8 carbon atoms, and the monomer other than (meth)acrylic acid alkyl ester, the same monomers as the monomers used in polymerization of the elastic copolymer (b-1) can be used.

As the intermediate polymer (b-3), a polymer obtained by polymerizing a monomer composition containing acrylic acid alkyl ester, methacrylic acid alkyl ester, a monomer other than (meth)acrylic acid alkyl ester, and a crosslinkable monomer is preferable. As the intermediate polymer (b-3), a polymer obtained by polymerizing a monomer composition containing acrylic acid alkyl ester having an alkyl group with 1 to 8 carbon atoms, methacrylic acid alkyl ester having an alkyl group with 1 to 4 carbon atoms, a monomer other than (meth)acrylic acid alkyl ester, and a crosslinkable monomer is more preferable. For example, the intermediate polymer (b-3) can contain 10 to 90% by mass of acrylic acid alkyl ester having an alkyl group with 1 to 8 carbon atoms, 90 to 10% by mass of methacrylic acid alkyl ester having an alkyl group with 1 to 4 carbon atoms, 0 to 20% by mass of the monomer other than (meth)acrylic acid alkyl ester, and 0 to 10% by mass of the crosslinkable monomer (100% by mass in total).

The same monomers as the monomers used in polymerization of the elastic copolymer (b-1) can be used as each monomer used in the intermediate polymer (b-3). In addition, the content (monomer component ratio) of acrylic acid alkyl ester in the intermediate polymer (b-3) is preferably lower than the content of acrylic acid alkyl ester in the elastic copolymer (b-1) and higher than the content of acrylic acid alkyl ester in the rigid polymer (b-2).

The average particle diameter of the acrylic rubber particles (B-2) is preferably 0.01 to 0.5 μm and more preferably 0.08 to 0.3 μm. Particularly, from the viewpoint of film formability, film toughness, and tensile elongation, the average particle diameter is preferably 0.08 μm or more. Incidentally, the average particle diameter is a value measured by a method to be described later.

A method for producing the acrylic rubber particles (B-2) is not particularly limited. As methods for producing the elastic copolymer (b-1) and the rigid polymer (b-2), for example, an emulsion polymerization method can be used. In addition, the elastic copolymer (b-1) and the rigid polymer (b-2) can also be produced by emulsifying suspension polymerization which includes converting an emulsion polymerization system into a suspension polymerization system at the time of polymerizing a polymer forming the outermost layer after emulsion polymerization. The polymerization temperature is appropriately selected depending on the kind and amount of a polymerization initiator to be used, but is preferably 40 to 120° C. and more preferably 60 to 95° C. As the polymerization initiator, known polymerization initiators can be used. The polymerization initiator can be added to either or both of the aqueous phase and the monomer phase.

Examples of an emulsifier which can be used in the emulsion polymerization method include anionic, cationic, and nonionic surfactants, but anionic surfactants are preferable. Examples of the anionic surfactants include a carboxylate surfactant such as potassium oleate, sodium stearate, sodium myristate, sodium N-lauroylsarcosinate, or dipotassium alkenylsuccinate; a sulfuric acid ester salt-based surfactant such as sodium laurylsulfate; a sulfonate surfactant such as sodium dioctylsulfosuccinate, sodium dodecylbenzenesulfonate, or sodium alkyl diphenyl ether disulfonate; and a phosphoric acid ester salt-based surfactant such as sodium polyoxyethylene alkyl phenyl ether phosphate. They may be used either singly or in combination of two or more kinds.

The polymer latex obtained by emulsion polymerization can be filtered, for example, by a filter having a mesh of 100 μm or less, and then separated and recovered by a method such as an acid solidification method, a salt solidification method, a freeze solidification method, or a spray drying method. In the acid solidification method, an inorganic acid such as sulfuric acid, hydrochloric acid, or phosphoric acid or an organic acid such as acetic acid can be used. In the salt solidification method, an inorganic salt such as sodium sulfate, magnesium sulfate, aluminum sulfate, or calcium chloride or an organic salt such as calcium acetate or magnesium acetate can be used. They may be used either singly or in combination of two or more kinds. The acrylic rubber particles (B-2) are obtained by further washing, dehydrating, drying, or the like the separated and recovered polymer.

[Thermoplastic Resin (B-3)]

The thermoplastic resin (B-3) is not particularly limited as long as it is a thermoplastic resin having a mass average molecular weight of less than 400,000 other than the reactive group-containing acrylic resin (B-1) and the acrylic rubber particles (B-2), and for example, the same thermoplastic resin as the thermoplastic polymer (A-2) used in preparation of the fluororesin composition (A) can be used.

[Additive (C)]

As the additive (C), the same additive (C) as the additive (C) used in preparation of the fluororesin composition (A) can be used as long as it is an additive other than (B-1), (B-2), and (B-3).

When a radical scavenger such as a hindered amine-based stabilizer is added as the additive (C), weather resistance becomes favorable. However, the fluororesin (A-1) may be colored by reaction with the hindered amine-based stabilizer, and the hindered amine-based stabilizer added to the acrylic resin layer (II) may gradually transit to the fluororesin layer (I) to occur coloration in some cases. Thus, the radical scavenger may not be added.

The transition to the fluororesin layer (I) can be suppressed by using a hindered amine-based stabilizer having a high molecular weight. The molecular weight of the hindered amine-based stabilizer is preferably 1,000 or more and more preferably 2,000 or more. As a hindered amine-based stabilizer having a molecular weight of 2,000 or more, Chimassorb 2020 (trade name, manufactured by BASF) is mentioned.

The thickness of the laminate film according to the invention is preferably 100 μm or less, more preferably 10 to 100 μm, further preferably 20 to 75 μm, and particularly preferably 25 to 60 μm. In a case where the thickness thereof is 10 μm or more, the laminate film is easily manufactured and it is possible to provide sufficient weather resistance to a melamine decorative panel to be obtained. On the other hand, in a case where the thickness thereof is 100 μm or less, the laminate film has suitable flexibility so that peeling off can be prevented when the melamine decorative panel to be obtained is cut. In addition, there is an economic advantage in terms of mass per unit area. Moreover, film formability is stabilized and thus the laminate film is easily manufactured. Furthermore, in a case where the laminate film is laminated on the melamine decorative panel, the pencil hardness of the decorative panel is increased so as to improve scratch resistance.

The thickness of the fluororesin layer (I) is preferably 0.5 to 30 μm, more preferably 2 to 10 μm, and further preferably 3 to 7 μm. In a case where the thickness of the fluororesin layer (I) is 0.5 μm or more, the chemical resistance of the melamine decorative panel to be obtained becomes favorable. In addition, in a case where the thickness of the fluororesin layer (I) is 30 μm or less, there is economic advantages in terms of mass per unit area. Further, in a case where the thermal shrinkage rates of the fluororesin layer (I) and the acrylic resin layer (II) are large, as the thickness of the fluororesin layer is decreased, the curling of the laminate film is suppressed, and thus the laminate film is excellent in handleability.

The thickness of the acrylic resin layer (II) is preferably 99.5 μm or less, more preferably 5 to 90 μm, further preferably 10 to 70 μm, and particularly preferably 20 to 55 μm. When the thickness of the acrylic resin layer (II) is 99.5 μm or less, there is an economic advantage in terms of mass per unit area. Further, when the thickness of the acrylic resin layer (II) is 5 μm or more, adhesiveness is improved. In addition, as the thickness of the acrylic resin layer (II) is increased, it is possible to provide weather resistance at a low concentration of an ultraviolet absorbing agent, which is advantageous. That is, in a case where the thickness thereof is in these ranges, it is possible to secure sufficient chemical resistance, adhesiveness, and weather resistance so that a laminate film having a high industrial utility value is obtained.

The fracture elongation of the laminate film according to the invention is preferably 5% or more from the viewpoint of film formability and film handleability. The fracture elongation thereof is more preferably 20% or more and further preferably 100% or more. The upper limit of the fracture elongation is not particularly limited, but can be set, for example, to be 1000% or less. Incidentally, the fracture elongation is a value measured by a method to be described later.

As a method for manufacturing the laminate film according to the invention, from the viewpoint of productivity, it is preferable to use a method of forming lamination structures of the fluororesin layer (I) and the acrylic resin layer (II) by a co-extrusion method through a feed block die or a multi-manifold die. In addition, it is also possible to use a method in which the fluororesin layer (I) and the acrylic resin layer (II) are formed in a film shape by a melt extrusion method or the like using a T die respectively and the two kinds of films are laminated by a thermal lamination method. Further, it is also possible to use an extrusion lamination method in which one resin layer is formed in a film shape and then the other resin layer is laminated by a melt extrusion method. In the case of performing melt extrusion, in order to remove cores or impurities causing surface defects, the resin composition in a melt state can also be extruded while being filtered with a screen mesh having 200 meshes or more.

Further, from the viewpoint of preventing thermal degradation of the resin composition (B), it is preferable to use a coating method in which a solution containing the resin composition (B) is applied onto the fluororesin layer (I) formed in a film shape to laminate the acrylic resin layer (II). For example, there is mentioned a method in which a solution obtained by dissolving the resin composition (B) in a solvent such as an organic solvent is applied onto the fluororesin layer (I) by a printing method such as a gravure printing method, a screen printing method, or an offset printing method, or a coating method such as a blade coating method or a rod coating method, and then heat drying is performed in order to remove the solvent. Incidentally, a solution containing the fluororesin composition (A) may be applied onto the acrylic resin layer (II) formed in a film shape to laminate the fluororesin layer (I).

Examples of the solvent include an alcohol-based solvent such as methanol, ethanol, isopropanol, n-butanol, or ethylene glycol; an aromatic solvent such as xylene, toluene, or benzene; an aliphatic hydrocarbon-based solvent such as hexane or pentane; a halogenated hydrocarbon-based solvent such as chloroform or carbon tetrachloride; a phenol-based solvent such as phenol or cresol; a ketone-based solvent such as methyl ethyl ketone, methyl isobutyl ketone, acetone, or cyclohexanone; an ether-based solvent such as diethylether, methoxytoluene, 1,2-dimethoxyethane, 1,2-dibutoxyethane, 1,1-dimethoxymethane, 1,1-dimethoxyethane, 1,4-dioxane, or tetrahydrofuran (THF); a fatty acid-based solvent such as formic acid, acetic acid, or propionic acid; an acid anhydride-based solvent such as acetic anhydride; an ester-based solvent such as ethyl acetate, n-propyl acetate, butyl acetate, or butyl formate; a nitrogen-containing solvent such as ethylamine, toluidine, dimethyl formamide, or dimethylacetamide; a sulfur-containing solvent such as thiophene or dimethyl sulfoxide; a solvent having two or more kinds of functional group such as diacetone alcohol, 2-methoxyethanol (methyl cellosolve), 2-ethoxyethanol (ethyl cellosolve), 2-butoxyethanol (butyl cellosolve), diethylene glycol, 2-aminoethanol, acetone cyanohydrin, diethanolamine, morpholine, 1-acetoxy-2-ethoxyethane, or 2-acetoxy-1-methoxypropane; and water. Of them, from the viewpoint of solubility, dimethyl formamide and dimethylacetamide are preferable. They may be used either singly or in combination of two or more kinds.

Depending on printability or coatability as a coating material, it is possible to add an additive for improving solution properties, such as an anti-skinning agent, a thickener, an anti-settling agent, an anti-sagging agent, an anti-foaming agent, or a leveling agent, to a resin composition. Further, it is possible to add an additive for improving the coating film performance, such as an extender pigment, a light stabilizer, an ultraviolet absorbing agent, an antioxidant, an anti-microbial agent, a mildew proofing agent, or a flame retardant, to a resin composition.

[Protection Film, Melamine Decorative Panel Surface Protection Film, and Melamine Decorative Panel]

The laminate film according to the invention has excellent adhesiveness and can be attached to various base materials. Thus, the laminate film according to the invention can be suitably used as a protection film. In particular, the laminate film according to the invention exhibits excellent adhesiveness to a melamine resin, and thus can be suitably used as a melamine decorative panel surface protection film. In addition, the melamine decorative panel according to the invention includes the laminate film according to the invention and the melamine base material laminated in order of the fluororesin layer (I), the acrylic resin layer (II), and the melamine base material.

The melamine decorative panel is used in a horizontal surface of a desk, a counter, or the like, or a vertical surface of a wall or the like. The configuration thereof and the manufacturing method therefor are described in detail in Decorative Panel HandBook (Shin-Kenjai Kenkyusho (New Building Material Laboratory), published in Showa 48 (1973)) or the like. The melamine decorative panel is obtained, for example, in such a manner that a melamine resin is impregnated in decorative paper for a decorative panel, the dried melamine resin-impregnated paper and a resin-impregnated core paper serving as a core material layer are laminated, as necessary, a melamine resin-impregnated overlay paper, which is obtained by impregnating a melamine resin in overlay paper and then drying the resultant product, for protecting a pattern of the decorative paper is further laminated and balance paper for suppressing warpage is further laminated at the lowermost layer, and then heat press molding is performed thereon.

As the melamine resin-impregnated paper, for example, a resin-impregnated paper, which is obtained by impregnating a melamine-formaldehyde resin in decorative paper for a decorative panel and then drying the resultant product, can be used. As the resin-impregnated core paper, for example, it is possible to use a core paper for a decorative panel obtained by impregnating a phenol-formaldehyde resin, a melamine-formaldehyde resin, or a slurry, which contains a resin solution containing a mixture of the above-escribed resins as main components and an inorganic filler such as aluminum hydroxide or calcium carbonate, in kraft paper, a nonwoven fabric, a woven fabric, or the like and then drying the resultant product. The heat press molding can be performed, for example, by laminating the resin-impregnated core paper, the melamine resin-impregnated paper (melamine base material), and the laminate film according to the invention under the conditions including a temperature of 110 to 170° C., a pressure of 5 to 10 MPa, and a time of 10 to 90 minutes.

When the laminate film according to the invention is bonded to the melamine base material, it is preferable that thermal fusion bonding is performed while the acrylic resin layer (II) formed from the resin composition (B) faces the melamine base material side and is in contact with the melamine base material. According to this method, bonding can be performed without using an adhesive and a pressure-sensitive adhesive. The bonding can be performed continuously or discontinuously, and for example, bonding can be performed by a discontinuous bonding method using a heat press method. Particularly, when the melamine decorative panel is produced, if the melamine base material and the laminate film according to the invention are laminated and then subjected to heat press molding as described above, the laminate film can be laminated at the same time of producing the melamine decorative panel. Thus, the number of processes can be reduced, which is advantageous.

Meanwhile, in a case where the laminate film according to the invention is not used and, for example, a film formed from an acrylic resin layer is used, adhesiveness with the melamine base material is low. Thus, it is necessary to use an adhesive or a primer so that costs are increased and productivity is largely decreased. On the other hand, in a case where the laminate film according to the invention is used, it is not necessary to use an adhesive or a primer so that the number of processes can be reduced and costs can be reduced, which is industrially advantageous.

EXAMPLES

Hereinafter, the invention will be described in more detail by means of Examples. However, the invention is not limited to these Examples. The term "part(s)" in Examples represents "part(s) by mass". In addition, abbreviations in Examples are as described below.

MMA: methyl methacrylate
MA: methyl acrylate
BA: butyl acrylate
St: styrene
HPMA: 2-hydroxypropyl methacrylate
HEMA: 2-hydroxyethyl methacrylate
HPA: 2-hydroxypropyl acrylate
2EHA: 2-ethylhexyl acrylate
AMA: allyl methacrylate
BDMA: 1,3-butylene glycol dimethacrylate
CHP: cumene hydroperoxide
t-BH: t-butyl hydroperoxide
t-HH: t-hexyl hydroperoxide
LPO: n-lauryl peroxide
n-OM: n-octylmercaptan
RS-610NA: sodium mono-n-dodecyloxytetraoxyethylenephosphate (trade name: "PHOSPHANOL RS-610NA", manufactured by Toho Chemical Industry Co., Ltd.)
SSL: sodium alkyl diphenyl ether disulfonate (trade name: "PELEX SSL", manufactured by Kao Corporation)
LA-31: "ADK STAB LA-31RG" (trade name) manufactured by ADEKA CORPORATION
LA-57: "ADK STAB LA-57" (trade name) manufactured by ADEKA CORPORATION Chimassorb 2020: "Chimassorb 2020" (trade name) manufactured by BASF TV234: "Tinuvin 234" (trade name) manufactured by BASF TV1600: "Tinuvin 1600" (trade name) manufactured by BASF Irg1076: "Irganox 1076" (trade name) manufactured by BASF T850: "KF Polymer T#850" (trade name) manufactured by KUREHA CORPORATION VH: "ACRYPET VH" (trade name) manufactured by Mitsubishi Rayon Co., Ltd.

MD: "ACRYPET MD" (trade name) manufactured by Mitsubishi Rayon Co., Ltd.

Measurement of various physical properties in Examples was carried out by the following methods.

(1) Mass Average Molecular Weight (Mw) and Molecular Weight Distribution

The mass average molecular weight (Mw) and the number average molecular weight of a polymer were obtained by the following method. The measurement was performed on a sample, which has been obtained by dissolving the polymer in tetrahydrofuran, at a temperature of 40° C. by using gel permeation chromatography (machine name: "HLC-8200", manufactured by Tosoh Corporation), a column (trade name: "TSK-GEL SUPER MULTIPORE HZ-H", manufactured by Tosoh Corporation, inner diameter 4.6 mm×length 15 cm×2), and an eluent (tetrahydrofuran). The mass average molecular weight (Mw) and the number average molecular weight were obtained from a calibration curve by standard polystyrene. Further, the molecular weight distribution was calculated by the following equation.

Molecular weight distribution=(mass average molecular weight)/(number average molecular weight)

(2) Glass Transition Temperature (Tg)

The glass transition temperature was calculated by using a value described in Polymer HandBook (J. Brandrup, Interscience, 1989) or a catalog value of a monomer manufacturer from the Fox equation.

(3) Average Particle Diameter

Regarding the average particle diameter of the acrylic rubber particles (B-2), the final particle diameter of a polymer latex of a polymer obtained in emulsion polymerization was measured by using a light scattering photometer (product name: "DLS-700", manufactured by Otsuka Electronics Co., Ltd.) and a dynamic light scattering method.

(4) Total Light Transmittance, Haze Value, Yellowness Index, Color Difference, and Whiteness The total light transmittance was evaluated according to JIS K7361-1, the haze value was evaluated according to JIS K7136, the yellowness index was evaluated according to JIS K7103, the color difference was evaluated according to JIS Z8730, and the whiteness was evaluated according to JIS Z8715.

(5) Melamine Base Material Curing Temperature

An endothermic peak temperature when the melamine base material was heated from 25° C. to 200° C. at 10° C./min under a nitrogen stream was measured by using DSC 6200 (product name, manufactured by SII Nano Technology Inc.) and then the measured endothermic peak temperature was regarded as a melamine base material curing temperature.

(6) Water Whitening Resistance Evaluation

A boiling test was carried out at 100° C. for 2 hours according to CEN (European Committee for Standardization) standards, EN438-2 to measure a change in whiteness before and after the boiling test.

(7) Adhesiveness Evaluation

Cutting of a lattice pattern with 100 sections at an interval of 1 mm was made on the melamine decorative panel in a room temperature state by a cutter knife, and then peeling-off property was checked by using a cellophane tape (manufactured by NICHIBAN CO., LTD.). This test was performed before and after the boiling test. A case where there is no peeled-off section was evaluated as "○", a case where there are 1 or more and 9 or less peeled-off sections was evaluated as "Δ", and a case where there are 10 or more peeled-off sections was evaluated as "x".

(8) Thicknesses of Fluororesin Layer (I) and Acrylic Resin Layer (II)

The laminate film was cut into a suitable size and then the thicknesses of the fluororesin layer (I) and the acrylic resin layer (II) were measured by using a reflectance spectral film thickness meter FE 3000 (trade name, manufactured by Otsuka Electronics Co., Ltd.).

(9) Hydroxyl Value

First, an acid value of a sample was obtained by the following method. The sample was dissolved in acetone and titrated with 0.1 mol/L of an ethanolic potassium hydroxide solution using phenolphthalein as an indicator. Further, a blank test was performed by the same operation, except that the sample was not used, and then the acid value was obtained from the following equation.

$$\text{Acid value}=(A-B)\times f\times 56.1\times 0.1/S$$

f: titer of 0.1 mol/L ethanolic potassium hydroxide

S: sample amount (g)

A: ethanolic potassium hydroxide amount (ml) used in titration

B: ethanolic potassium hydroxide amount (ml) used in blank test

Next, the sample was dissolved in acetic anhydride and pyridine to perform acetylation, and then was titrated with 0.5 mol/L of an ethanolic potassium hydroxide solution using phenolphthalein as an indicator. Further, a blank test was performed by the same operation, except that the sample was not used, and then the hydroxyl value was obtained from the following equation.

$$\text{Hydroxyl value}=(B-A)\times f\times 56.1\times 0.5/S+\text{acid value}$$

f: titer of 0.5 mol/L ethanolic potassium hydroxide

S: sample amount (g)

A: ethanolic potassium hydroxide amount (ml) used in titration

B: ethanolic potassium hydroxide amount (ml) used in blank test

(10) Curling Evaluation

The obtained laminate film was cut in a rectangular shape of 20 cm, placed on a flat glass plate while the fluororesin layer (I) was set as the upper surface, and held at 25° C. and a humidity of 50% for 6 hours, and the state of the film end portion was observed by visual inspection. A case where the end portion was in contact with the glass surface was designated as "○", a case where the end portion floated from the glass surface was designated as "Δ", and a case where the end portion was curled to be in contact with the upper surface of the laminate film was designated as "x".

(11) Acetone Test

Acetone was dropped on the surface of the melamine decorative panel. After 1 minute, the surface was wiped with a cloth and then the appearance thereof was observed by visual inspection. A case where there is no trace was designated as "1", a case where trace was slightly observed was designated as "2", a case where trace was clearly observed and whitening was observed was designated as "3", a case where trace was clearly observed and unevenness slightly occurs on the surface was designated as "4", and a case where unevenness clearly occurs on the surface was designated as "5".

(12) Coating Test

Coating was performed on the surface of the melamine decorative panel by using a coating spray (trade name: Silicone Lacquer Spray Black, manufactured by Kanpe Hapio Co., Ltd.) and then a petri dish was placed for 5 minutes at the coating place while facing down so as to be sealed in order to adjust the drying speed. Thereafter, drying was performed at room temperature for 1 hour or longer. Thereafter, coating was removed by using a wiping spray (trade name: KSR-300, manufactured by ABC TRADING CO., LTD.) and then appearance thereof was observed by visual inspection. A case where there is no trace was designated as "1", a case where trace was slightly observed was designated as "2", and a case where trace was clearly observed was designated as "3".

(13) Fracture Elongation

The obtained laminate film was cut in 150 mm×15 mm with the film formation direction as a long side, a tension test was carried out using Autograph Tension Tester (trade name, manufactured by Shimadzu Cooperation) at an inter-chuck distance of 100 mm and a tension rate of 50 mm/min, and then the fracture elongation of the laminate film was measured.

(14) Pencil Hardness

The obtained laminate film was laminated on an acrylic resin plate L001 (trade name, manufactured by Mitsubishi Rayon Co., Ltd.) such that the acrylic resin layer (II) was in contact with the acrylic resin plate, and then adhesion was carried out by heat press. The obtained laminate plate was evaluated according to HS K-5600-5-4 by using an electric system pencil scratch hardness tester 553-M1 (trade name, manufactured by YASUDA SEIKI SEISAKUSHO, LTD.) and Uni (trade name, manufactured by Mitsubishi Pencil Co., Ltd.).

(15) Weather Resistance Evaluation

A test for 3,000 hours was carried out independently on the melamine decorative panel and the laminate film by using a superxenon weather meter SX75 (trade name, manufactured by Suga Test Instruments Co., Ltd.) at an irradiation intensity of 60 W/m$^2$ (300 to 400 nm) with a filter #275 in such a manner that irradiation (63° C., 50% RH) for 102 minutes and irradiation+spraying (95% RH) for 18 minutes (120 minutes in total) were regarded as one cycle and the fluororesin layer (I) side was used as a test surface. The film adhesiveness and the color difference change of the melamine decorative panel and the yellowness index change of the laminate film alone before and after the test were evaluated in the same manner as described above.

(16) Laminate Film Appearance

The obtained laminate film was cut into an A4 size. By using a fish eye counter manufactured by MEC Co., Ltd., fish eyes with a surface area of 0.01 mm$^2$ or more were selected, and those derived from thermal degradation, namely, those not derived from foreign materials, and in other words, those having no profile among the selected fish eyes were counted by an observation under a microscope. The detection was performed on an area of 0.04 m$^2$, and the counts were converted to the number per 1 m$^2$. A case where the number of fish eyes was less than 100 was designated as "○", a case where the number of fish eyes was 100 or more and less than 500 was designated as "Δ", and a case where the number of fish eyes was 1,000 or more was designated as

(17) Gel Fraction 50 ml of acetone was added to 0.5 g of the obtained resin composition (B) and the resultant mixture was stirred at 65° C. for 4 hours. Thereafter, centrifugal separation was performed at 4° C. and 14,000 rpm for 30 minutes to remove the supernatant, then 50 ml of acetone was added again, and centrifugal separation was performed again under the same conditions. After removing the supernatant, the precipitated gel portion was subjected to vacuum drying for 8 hours, then the mass thereof was measured, and the gel fraction was calculated by the following equation.

Gel fraction (%)=mass(g) of gel portion/0.5×100

Production Examples 1 to 4: Production of Fluororesin Compositions (A1) to (A4)

In Production Example 1, 0.1 part of Irg1076 as the additive (C) was added to 100 parts of a polymer mixture obtained by mixing 90 parts of T850 as the fluororesin (A-1) and 10 parts of VH as the thermoplastic polymer (A-2) and then was mixed using a Henschel mixer. Next, the resultant mixture was melted and kneaded by using a 35-mmφ twin screw extruder (L/D=26) under the conditions including a cylinder temperature of 200° C. to 240° C. and a die temperature of 240° C. to obtain a pellet, thereby obtaining a fluororesin composition (A1) for the fluororesin layer (I).

Further, in Production Examples 2 to 4, acrylic resin compositions (A2) to (A4) for the fluororesin layer (I) were obtained in the same manner as in Production Example 1, except that the blending amounts of T850 and VH were changed to values presented in Table 1.

TABLE 1

| | Fluororesin composition | Blending [parts] | | |
|---|---|---|---|---|
| | | T850 | VH | Irg1076 |
| Production Example 1 | A1 | 90 | 10 | 0.1 |
| Production Example 2 | A2 | 75 | 25 | 0.1 |
| Production Example 3 | A3 | 68 | 32 | 0.1 |
| Production Example 4 | A4 | 50 | 50 | 0.1 |

Production Examples 5 to 10: Production of Reactive Group-Containing Acrylic Resins (B-1A) to (B-1F)

In Production Example 5, a mixture of the following components was incorporated into a reaction container equipped with a stirrer, a reflux condenser, a nitrogen gas introduction port, and the like.

| | |
|---|---|
| MMA | 70 parts |
| BA | 15 parts |
| HPMA | 15 parts |
| n-OM | 0.17 part |
| LPO | 0.4 part |
| Copolymer of methyl methacrylate/methacrylic acid salt/sulfoethyl methacrylate salt | 0.02 part |
| Sodium sulfate | 0.3 part |
| deionized water | 145 parts |

After nitrogen gas was sufficiently purged in the container, the mixture was heated up to 75° C. with stirring to allow polymerization reaction to proceed. After 2 hours, the temperature was increased to 95° C. and was further maintained for 60 minutes to complete the polymerization. The obtained polymer beads were dehydrated and dried to obtain a reactive group-containing acrylic resin (B-1A).

In Production Examples 6 to 10, reactive group-containing acrylic resins (B-1B) to (B-1F) were obtained in the same manner as in Production Example 5, except that components to be used were changed as presented in Table 2. Incidentally, although not described in Table 2, the blending amount of the LPO, the copolymer of methyl methacrylate/methacrylic acid salt/sulfoethyl methacrylate salt, the sodium sulfate, and the deionized water was the same as in Production Example 5.

coagulation using calcium acetate, aggregation, and a solidification reaction were performed thereon, and then the resultant product was filtered, washed with water, and then dried to obtain acrylic rubber particles (B-2A).

(i)

| Sodium formaldehyde sulfoxylate | 0.4 part |
|---|---|
| Ferrous sulfate | 0.00004 part |
| Disodium ethylenediamine tetraacetate | 0.00012 part |

TABLE 2

| | Reactive group- | Blending [parts] | | | | | | | | Tg |
|---|---|---|---|---|---|---|---|---|---|---|
| | containing acrylic resin | MMA | MA | BA | HPMA | HEMA | HPA | n-OM | Mw | [° C.] |
| Production Example 5 | B-1A | 70 | 0 | 15 | 15 | 0 | 0 | 0.17 | 138,000 | 56 |
| Production Example 6 | B-1B | 70 | 0 | 15 | 15 | 0 | 0 | 0.30 | 81,000 | 56 |
| Production Example 7 | B-1C | 69 | 1 | 0 | 30 | 0 | 0 | 0.25 | 103,000 | 76 |
| Production Example 8 | B-1D | 60 | 10 | 0 | 0 | 30 | 0 | 0.15 | 159,000 | 77 |
| Production Example 9 | B-1E | 75 | 10 | 0 | 0 | 0 | 15 | 0.30 | 88,100 | 72 |
| Production Example 10 | B-1F | 55 | 0 | 30 | 15 | 0 | 0 | 0.17 | 152,000 | 28 |

Production Example 11: Production of Acrylic Rubber Particles (B-2A)

Under a nitrogen atmosphere, 206 parts of deionized water was put into a reaction container equipped with a reflux condenser and heated to 80° C. Components (i) described below were added thereto, and 1/10 of components (ii) described below (parts of raw materials for the elastic copolymer (b-1)) were incorporated thereinto with stirring and then held for 15 minutes. Then, the remaining components (ii) were continuously added such that the increase rate of the monomer mixture with respect to water became 8% by mass/hr. Thereafter, the mixture was held for 1 hour to perform polymerization, thereby obtaining a polymer latex. Subsequently, 0.2 part of sodium formaldehyde sulfoxylate was added to the polymer latex. Thereafter, the mixture was held for 15 minutes, components (iii) described below (parts of raw materials for the elastic copolymer (b-1)) were continuously added with stirring at 80° C. under a nitrogen atmosphere such that the increase rate of the monomer mixture with respect to water became 4% by mass/hr. Thereafter, the mixture was held for 2 hours to perform polymerization, thereby obtaining a latex of the elastic copolymer (b-1).

0.2 part by mass of sodium formaldehyde sulfoxylate was added to this latex of the elastic copolymer (b-1). Thereafter, the mixture was held for 15 minutes, components (iv) described below (raw materials for the rigid polymer (b-2)) were continuously added with stirring at 80° C. under a nitrogen atmosphere such that the increase rate of the monomer mixture with respect to water became 10% by mass/hr. Thereafter, the mixture was held for 1 hour to perform polymerization, thereby obtaining a latex of acrylic rubber particles (B-2A). The average particle diameter of the acrylic rubber particles (B-2A) was 0.28 µm.

This latex of the acrylic rubber particles (B-2A) was filtered by a filter having a mesh of 50 µm. Subsequently, (ii)

| MMA | 11.25 parts |
|---|---|
| BA | 12.5 parts |
| St | 1.25 parts |
| AMA | 0.094 part |
| BDMA | 0.75 part |
| t-BH | 0.044 part |
| RS-610NA | 0.75 part |

(iii)

| BA | 30.9 parts |
|---|---|
| St | 6.6 parts |
| AMA | 0.66 part |
| BDMA | 0.09 part |
| CHP | 0.11 part |
| RS-610NA | 0.6 part |

(iv)

| MMA | 35.6 parts |
|---|---|
| MA | 1.9 parts |
| n-OM | 0.11 part |
| t-BH | 0.06 part |

Production Example 12: Production of Acrylic Rubber Particles (B-2B)

Under a nitrogen atmosphere, 153 parts of deionized water was put into a reaction container equipped with a reflux condenser and heated to 80° C. Components (i) described below were added thereto, and components (ii) described below (raw materials for the elastic copolymer (b-1)) were added with stirring. Thereafter, the mixture was held for 1 hour to perform polymerization, thereby obtaining a polymer latex. Subsequently, 0.1 part of sodium formaldehyde sulfoxylate was added to the polymer latex. Thereafter, the mixture was held for 15 minutes, components (iii) described below (raw materials for the rigid polymer (b-2))

were added with stirring at 80° C. under a nitrogen atmosphere. Thereafter, the mixture was held for 1 hour to perform polymerization, thereby obtaining a latex of acrylic rubber particles (B-2B). The average particle diameter of the acrylic rubber particles (B-2B) was 0.12 μm.

This latex of the acrylic rubber particles (B-2B) was filtered by a filter having a mesh of 50 μm. Subsequently, coagulation using calcium acetate, aggregation, and a solidification reaction were performed thereon, and then the resultant product was filtered, washed with water, and then dried to obtain acrylic rubber particles (B-2B).

(i)

| Sodium formaldehyde sulfoxylate | 0.4 part |
|---|---|
| Ferrous sulfate | 0.00004 part |
| Disodium ethylenediamine tetraacetate | 0.00012 part |

(ii)

| BA | 50.9 parts |
|---|---|
| St | 11.6 parts |
| AMA | 0.56 part |
| t-BH | 0.19 part |
| RS-610NA | 1.0 part |

(iii)

| MMA | 35.6 parts |
|---|---|
| MA | 1.9 parts |
| t-BH | 0.056 part |
| n-OM | 0.16 part |
| RS-610NA | 0.25 part |

Production Example 13: Production of Acrylic Rubber Particles (B-2C)

Components (i) described below were preliminarily dispersed at 10,000 rpm for 5 minutes with a homomixer, and then emulsified and dispersed at a pressure of 20 MPa by a Gaulin homogenizer, thereby preparing a pre-emulsion of 2EHA.

Into a 5-necked flask equipped with a stirrer, a reflux condenser, a nitrogen introduction port, a monomer addition port, and a thermometer, the pre-emulsion of 2EHA was put, 0.5 part of t-BH was put thereinto, and then the temperature in the flask was increased to 50° C. while performing nitrogen purging and mixing and stirring.

Into the flask, a mixed solution of 0.002 part of ferrous sulfate, 0.006 part of disodium ethylenediamine tetraacetate, 0.26 part of Rongalite, and 5 parts of distilled water was put. The mixed solution was left to stand for 5 hours to complete polymerization, thereby obtaining a latex.

Next, separately from the above-described flask, a second 5-necked flask equipped with a stirrer, a reflux condenser, a nitrogen introduction port, a monomer addition port, and a thermometer, the latex was put to have 20 parts in terms of solid content, 0.7 part of SSL was put as the solid content, and 155 parts of distilled water was further put. Subsequently, components (ii) described below were put thereinto.

The inside of the flask was stirred for 10 minutes and the components (ii) were impregnated in particles of the latex. After the inside of the flask was further stirred for 10 minutes, the inside of the flask was purged with nitrogen, the temperature in the flask was increased to 50° C., a mixed solution of 0.002 part of ferrous sulfate, 0.006 part of disodium ethylenediamine tetraacetate, 0.26 part of Rongalite, and 5 parts of distilled water was put into the flask, and then radical polymerization was initiated. The temperature in the flask was held at 70° C. for 2 hours and then polymerization was completed, thereby obtaining an acrylic composite rubber latex of a rubber having a 2EHA unit as a main component and a rubber having a BA unit as a main component.

Then, components (iii) described below were added dropwise to the acrylic composite rubber latex over 30 minutes while the temperature in the flask was held at 70° C.

After completion of dropwise addition, the temperature in the flask was held at 70° C. for 4 hours to obtain a latex of acrylic rubber particles (B-2C).

The obtained latex of acrylic rubber particles (B-2C) were coagulated by 500 parts by mass of 7.5% by mass calcium acetate aqueous solution and then subjected to heat treatment at 90° C. to be solidified. Thereafter, the solidified product was washed with hot water and then further dried to obtain a powder of acrylic rubber particles (B-2C).

(i)

| 2EHA | 99.5 parts |
|---|---|
| AMA | 0.5 part |
| SSL | 2 parts (in terms of solid content) |
| Distilled water | 195 parts |

(ii)

| BA | 68 parts |
|---|---|
| AMA | 1 part |
| t-BH | 0.24 part |

(iii)

| MMA | 11 parts |
|---|---|
| t-BH | 0.1 part |

Production Example 14: Production of Acrylic Rubber Particles (B-2D)

Into a container equipped with a stirrer, 8.5 parts of deionized water was incorporated. After that, components (ii) described below (parts of raw materials for the elastic copolymer (b-1)) were added with stirring and the resultant mixture was stirred for 20 minutes to prepare an emulsion.

Next, 191.5 parts of deionized water and components (i) described below were put into a polymerization container equipped with a condenser, and the temperature was increased to 70° C. Subsequently, the prepared emulsion was added dropwise into the polymerization container over 8 minutes with stirring under nitrogen, and the reaction was continued for 15 minutes.

Subsequently, components (iii) described below (parts of raw materials for the elastic copolymer (b-1)) were added dropwise over 90 minutes in the polymerization container, and then the reaction was continued for 60 minutes to obtain a latex of the elastic copolymer (b-1). Incidentally, Tg of the elastic copolymer (b-1) alone was −48° C.

Subsequently, components (iv) described below were added dropwise over 45 minutes in the polymerization container, and then the reaction was continued for 60 minutes to form the intermediate polymer (b-3) on the elastic copolymer (b-1). Incidentally, Tg of the intermediate polymer (b-3) alone was 20° C.

Subsequently, components (v) described below were added dropwise over 140 minutes in the polymerization container, and then the reaction was continued for 60 minutes to form the rigid polymer (b-2) on the intermediate polymer (b-3). According to the above processes, a latex containing 100 parts of acrylic rubber particles (B-1D) was obtained. Incidentally, Tg of the rigid polymer (b-2) alone was 84° C. Further, the average particle diameter of the acrylic rubber particles (B-1D) measured after the polymerization was 0.12 μm.

This latex of the acrylic rubber particles (B-1D) was filtered by a filter having a mesh of 50 μm. Subsequently, coagulation using calcium acetate, aggregation, and a solidification reaction were performed thereon, and then the resultant product was filtered, washed with water, and then dried to obtain acrylic rubber particles (B-1D).

(i)

| Sodium formaldehyde sulfoxylate | 0.2 part |
| Ferrous sulfate | 0.0001 part |
| Disodium ethylenediamine tetraacetate | 0.0003 parts |

(ii)

| MMA | 0.3 part |
| BA | 4.5 parts |
| AMA | 0.05 part |
| BDMA | 0.2 part |
| CHP | 0.025 part |
| RS-610NA | 1.1 parts |

(iii)

| MMA | 1.5 parts |
| BA | 22.5 parts |
| AMA | 0.25 part |
| BDMA | 1.0 part |
| CHP | 0.016 part |

(iv)

| MMA | 6.0 parts |
| BA | 4.0 parts |
| AMA | 0.075 part |
| CHP | 0.013 part |

(v)

| MMA | 55.2 parts |
| BA | 4.8 parts |
| n-OM | 0.22 part |
| t-BH | 0.075 part |

Production Example 15: Production of Thermoplastic Polymer (C1)

200 parts of deionized water was incorporated into a reaction container purged with nitrogen, and 1 part of potassium oleate as an emulsifier and 0.3 part of potassium persulfate were incorporated thereinto. Next, 40 parts of MMA, 10 parts of BA, and 0.005 part of n-OM were incorporated thereinto and the resultant mixture was stirred at 65° C. for 3 hours under a nitrogen atmosphere to complete the polymerization. Subsequently, a monomer mixture formed from 48 parts of MMA and 2 parts of BA was added dropwise over 2 hours, and after completion of dropwise addition, was held for 2 hours to complete the polymerization. The obtained latex was added to 0.25% by mass of sulfuric acid aqueous solution, and a polymer was coagulated with acid. Thereafter, dehydrating, washing with water, and drying were performed and then the polymer was recovered in a powder state. The mass average molecular weight of the obtained thermoplastic polymer (C1) was 1,000,000.

Production Examples 16 to 28: Production of Resin Compositions (B1) to (B13)

In Production Example 16, 100 parts of the reactive group-containing acrylic resin (B-1A) of Production Example 5 as the reactive group-containing acrylic resin (B-1), 2.1 parts of LA-31, 2 parts of the thermoplastic polymer (C1) of Production Example 15, 0.45 part of Chimassorb 2020, and 0.1 part of Irg1076 were used and mixed with a Henschel mixer. Next, the resultant mixture was melted and kneaded by using a 35-mmφ twin screw extruder (L/D=26) under the conditions including a cylinder temperature of 200° C. to 240° C. and a die temperature of 240° C. to obtain a pellet, thereby obtaining the resin composition (B1) for the acrylic resin layer (II).

In Production Examples 17 to 28, resin compositions (B2) to (B13) for the acrylic resin layer (II) were obtained in the same manner as in Production Example 16, except that materials as presented in Table 3 were used as the reactive group-containing acrylic resin (B-1), the acrylic rubber particles (B-2), and the additive (C). Incidentally, "Content of monomer unit having reactive substituent" in Table 3 is a value calculated from the incorporated amount of the raw material.

TABLE 3

| Resin composition | | B-1 [parts] | | | | | | B-2 [parts] | | | |
|---|---|---|---|---|---|---|---|---|---|---|---|
| | | B-1A | B-1B | B-1C | B-1D | B-1E | B-1F | B-2A | B-2B | B-2C | B-2D |
| Production Example 16 | B1 | 100 | 0 | 0 | 0 | 0 | 0 | 0 | 0 | 0 | 0 |
| Production Example 17 | B2 | 80 | 0 | 0 | 0 | 0 | 0 | 20 | 0 | 0 | 0 |
| Production Example 18 | B3 | 80 | 0 | 0 | 0 | 0 | 0 | 20 | 0 | 0 | 0 |
| Production Example 19 | B4 | 80 | 0 | 0 | 0 | 0 | 0 | 20 | 0 | 0 | 0 |

TABLE 3-continued

| | | | | | | | | | | | |
|---|---|---|---|---|---|---|---|---|---|---|---|
| Production Example 20 | B5 | 80 | 0 | 0 | 0 | 0 | 0 | 0 | 20 | 0 | 0 |
| Production Example 21 | B6 | 90 | 0 | 0 | 0 | 0 | 0 | 0 | 0 | 10 | 0 |
| Production Example 22 | B7 | 0 | 80 | 0 | 0 | 0 | 0 | 0 | 20 | 0 | 0 |
| Production Example 23 | B8 | 0 | 60 | 0 | 0 | 0 | 0 | 0 | 40 | 0 | 0 |
| Production Example 24 | B9 | 0 | 0 | 20 | 0 | 0 | 0 | 0 | 0 | 0 | 80 |
| Production Example 25 | B10 | 0 | 0 | 10 | 0 | 0 | 0 | 0 | 0 | 0 | 90 |
| Production Example 26 | B11 | 0 | 0 | 0 | 20 | 0 | 0 | 0 | 0 | 0 | 80 |
| Production Example 27 | B12 | 0 | 0 | 0 | 0 | 70 | 0 | 30 | 0 | 0 | 0 |
| Production Example 28 | B13 | 0 | 0 | 0 | 0 | 0 | 70 | 0 | 30 | 0 | 0 |

| | C [parts] | | | | | Content of monomer unit having reactive substituent [%] | Hydroxyl value [mgKOH/g] | Gel fraction [%] |
|---|---|---|---|---|---|---|---|---|---|
| | LA-31 | C1 | Chimassorb 2020 | LA-57 | Irg1076 | | | |
| Production Example 16 | 2.1 | 2 | 0.45 | 0 | 0.1 | 14.3 | 52 | 0 |
| Production Example 17 | 2.1 | 2 | 0.45 | 0 | 0.1 | 11.5 | 42 | 18 |
| Production Example 18 | 2.1 | 2 | 0 | 0.3 | 0.1 | 11.5 | 42 | 17 |
| Production Example 19 | 2.1 | 2 | 0 | 0 | 0.1 | 11.5 | 41 | 18 |
| Production Example 20 | 2.1 | 2 | 0 | 0.3 | 0.1 | 11.5 | 42 | 15 |
| Production Example 21 | 2.1 | 2 | 0.45 | 0 | 0.1 | 12.9 | 46 | 9 |
| Production Example 22 | 2.1 | 2 | 0.45 | 0 | 0.1 | 11.5 | 41 | 16 |
| Production Example 23 | 2.1 | 2 | 0.45 | 0 | 0.1 | 8.6 | 35 | 32 |
| Production Example 24 | 2.1 | 2 | 0.45 | 0 | 0.1 | 5.7 | 22 | 48 |
| Production Example 25 | 2.1 | 2 | 0.45 | 0 | 0.1 | 2.9 | 10 | 53 |
| Production Example 26 | 2.1 | 2 | 0.45 | 0 | 0.1 | 5.7 | 21 | 47 |
| Production Example 27 | 2.1 | 2 | 0.45 | 0 | 0.1 | 10.0 | 35 | 23 |
| Production Example 28 | 2.1 | 2 | 0.45 | 0 | 0.1 | 10.0 | 38 | 24 |

Examples 1 to 27: Production of Laminate Film and Melamine Decorative Panel

In Example 1, T850 and the resin composition (B2) for the acrylic resin layer (II) obtained in Production Example 17 were dried at 80° C. for a whole day. The T850 was plasticized by a 30-mmϕ extruder in which the cylinder temperature was set to 230° C. Further, the resin composition (B2) was plasticized by a 40-mmϕ extruder in which the cylinder temperature was set to 240° C. and a screen mesh having 400 meshes was provided. Next, the T850 and the resin composition (B2) were formed into a laminate film having a thickness of 50 μm by a feed block die for two kinds and two layers set to 250° C. while the fluororesin layer (I) side was in contact with a mirror-finished cooling roller. The thicknesses of the fluororesin layer (I) and the acrylic resin layer (II) were 5 μm and 45 μm, respectively.

Further, the melamine base material was laminated at the acrylic resin layer (II) surface side of the laminate film and subjected to pressing under the conditions including a temperature of 140° C., a pressure of 4 MPa, and a time of 20 minutes, thereby producing a melamine decorative panel. The evaluation results of the obtained melamine decorative panel are presented in Table 4. The curing temperature of the used melamine base material was 94° C.

Further, in Examples 2 to 27, a laminate film and a melamine decorative panel were produced by the same operation as in Example 1, except that materials as presented in Table 4 and Table 5 were used as the fluororesin composition (A) for the fluororesin layer (I) and the resin composition (B) for the acrylic resin layer (II) and the thicknesses of the fluororesin layer (I) and the acrylic resin layer (II) were set as presented in Table 4 and Table 5. The evaluation results of the obtained melamine decorative panel are presented in Table 4 and Table 5.

Comparative Examples 1 to 3

A laminate film and a melamine decorative panel were produced by the same operation as in Example 1, except that materials as presented in Table 5 were used as the fluororesin composition (A) for the fluororesin layer (I) and the resin composition (B) for the acrylic resin layer (II) and the thicknesses of the fluororesin layer (I) and the acrylic resin layer (II) were set as presented in Table 5. The evaluation results of the obtained melamine decorative panel are presented in Table 5. Comparative Example 2 is a single-layered film formed only from the acrylic resin layer (II). Comparative Example 3 is the case of not using the laminate film.

TABLE 4

| | Fluororesin layer (I) | | Acrylic resin layer (II) | | Content of monomer unit having reactive substituent [%] | Total light transmittance [%] | Haze value | Yellowness index | Fracture elongation [%] | Initial state | |
|---|---|---|---|---|---|---|---|---|---|---|---|
| | A | Thickness [μm] | B | Thickness [μm] | | | | | | Adhesiveness | Whiteness |
| Example 1 | T850 | 5 | B2 | 45 | 11.5 | 93.1 | 6.4 | 2.8 | 60 | ○ | 10 |
| Example 2 | T850 | 5 | B3 | 45 | 11.5 | 93.2 | 7.8 | 2.6 | 63 | ○ | 10 |
| Example 3 | T850 | 5 | B4 | 45 | 11.5 | 93.1 | 7.3 | 2.7 | 61 | ○ | 10 |
| Example 4 | T850 | 5 | B5 | 45 | 11.5 | 93.3 | 7.9 | 2.6 | 56 | ○ | 10 |
| Example 5 | T850 | 3 | B7 | 27 | 11.5 | 93.3 | 5.8 | 2.1 | 10 | ○ | 10 |
| Example 6 | T850 | 5 | B7 | 45 | 11.5 | 93.1 | 6.9 | 2.4 | 21 | ○ | 10 |
| Example 7 | T850 | 5 | B7 | 25 | 11.5 | 93.3 | 6.4 | 2.3 | 18 | ○ | 10 |
| Example 8 | T850 | 8 | B7 | 42 | 11.5 | 93.3 | 7.6 | 2.8 | 23 | ○ | 10 |
| Example 9 | T850 | 5 | B8 | 45 | 8.6 | 92.8 | 7.0 | 2.1 | 120 | ○ | 10 |
| Example 10 | T850 | 5 | B9 | 45 | 5.7 | 92.9 | 9.7 | 3.2 | 93 | ○ | 10 |
| Example 11 | T850 | 5 | B11 | 45 | 5.7 | 92.3 | 34.2 | 5.5 | 82 | ○ | 10 |
| Example 12 | T850 | 5 | B12 | 45 | 10.0 | 93.1 | 8.4 | 2.6 | 79 | ○ | 10 |
| Example 13 | A1 | 5 | B2 | 45 | 11.5 | 93.0 | 2.9 | 2.1 | 73 | ○ | 10 |
| Example 14 | A2 | 5 | B4 | 45 | 11.5 | 93.0 | 2.7 | 1.6 | 65 | ○ | 10 |
| Example 15 | A3 | 5 | B1 | 45 | 14.3 | 92.5 | 0.8 | 0.9 | 12 | Δ | 10 |

| | After boiling test | | Curling | Film appearance | Pencil hardness | Chemical resistance | | Weather resistance | | |
|---|---|---|---|---|---|---|---|---|---|---|
| | Adhesiveness | Whiteness | | | | Coating test | Acetone test | Film yellowness index displacement | Laminate plate color difference | Laminate plate adhesiveness |
| Example 1 | ○ | 19 | X | ○ | B | 1 | 1 | 0.5 | 3.7 | ○ |
| Example 2 | ○ | 20 | X | ○ | B | 1 | 1 | — | — | — |
| Example 3 | ○ | 20 | X | ○ | B | 1 | 1 | — | — | — |
| Example 4 | ○ | 21 | X | ○ | B | 1 | 1 | — | — | — |
| Example 5 | ○ | 23 | X | ○ | HB | 1 | 1 | — | — | — |
| Example 6 | Δ | 20 | X | ○ | B | 1 | 1 | 0.7 | 4.2 | ○ |
| Example 7 | ○ | 22 | X | ○ | HB | 1 | 1 | — | — | — |
| Example 8 | Δ | 19 | X | ○ | B | 1 | 1 | — | — | — |
| Example 9 | ○ | 17 | X | ○ | 2B | 1 | 1 | 0.7 | 3.7 | ○ |
| Example 10 | Δ | 28 | X | Δ | 2B | 1 | 1 | — | — | — |
| Example 11 | Δ | 36 | X | X | 2B | 1 | 1 | — | — | — |
| Example 12 | Δ | 17 | X | ○ | B | 1 | 1 | — | — | — |
| Example 13 | ○ | 19 | Δ | ○ | F | 1 | 2 | 0.7 | 3.8 | ○ |
| Example 14 | ○ | 24 | ○ | ○ | F | 1 | 3 | 0.8 | 3.6 | ○ |
| Example 15 | Δ | 32 | ○ | ○ | F | 1 | 4 | — | — | — |

TABLE 5

| | Fluororesin layer (I) | | Acrylic resin layer (II) | | Content of monomer unit having reactive substituent [%] | Total light transmittance [%] | Haze value | Yellowness index | Fracture elongation [%] | Initial state | |
|---|---|---|---|---|---|---|---|---|---|---|---|
| | A | Thickness [μm] | B | Thickness [μm] | | | | | | Adhesiveness | Whiteness |
| Example 16 | A3 | 5 | B2 | 45 | 11.5 | 92.7 | 1.7 | 1.4 | 72 | ○ | 10 |
| Example 17 | A3 | 5 | B3 | 45 | 11.5 | 92.9 | 1.1 | 1.0 | 70 | ○ | 10 |
| Example 18 | A3 | 5 | B5 | 45 | 11.5 | 93.0 | 1.3 | 1.1 | 36 | ○ | 10 |
| Example 19 | A3 | 5 | B6 | 45 | 12.9 | 92.4 | 3.3 | 2.5 | 32 | ○ | 10 |
| Example 20 | A3 | 5 | B7 | 45 | 11.5 | 92.8 | 0.8 | 0.8 | 9 | ○ | 10 |
| Example 21 | A3 | 5 | B13 | 45 | 10.0 | 92.7 | 1.0 | 1.4 | 197 | ○ | 10 |
| Example 22 | A3 | 3 | B8 | 27 | 8.6 | 93.0 | 1.1 | 0.8 | 155 | ○ | 10 |
| Example 23 | A3 | 5 | B8 | 25 | 8.6 | 93.0 | 0.7 | 0.7 | 147 | ○ | 10 |
| Example 24 | A3 | 5 | B8 | 45 | 8.6 | 92.7 | 1.4 | 0.9 | 159 | ○ | 10 |
| Example 25 | A3 | 8 | B8 | 42 | 8.6 | 93.0 | 1.2 | 0.9 | 154 | ○ | 10 |
| Example 26 | A3 | 13 | B8 | 62 | 8.6 | 92.9 | 1.4 | 1.3 | 179 | ○ | 10 |
| Example 27 | A4 | 5 | B4 | 45 | 11.5 | 92.8 | 1.2 | 1.1 | 28 | ○ | 10 |

TABLE 5-continued

| | | | | | | | | | | | |
|---|---|---|---|---|---|---|---|---|---|---|---|
| Comparative Example 1 | T850 | 5 | B10 | 45 | 2.9 | 92.8 | 13.0 | 3.5 | 73 | ○ | 10 |
| Comparative Example 2 | — | — | B1 | 50 | 14.3 | 92.4 | 0.8 | 0.7 | 7 | ○ | 10 |
| Comparative Example 3 | — | — | — | — | — | — | — | — | — | — | — |

| | After boiling test | | Film curling | Film appearance | Pencil hardness | Chemical resistance | | Weather resistance | | Laminate plate adhesiveness |
|---|---|---|---|---|---|---|---|---|---|---|
| | Adhesiveness | Whiteness | | | | Coating test | Acetone test | Film yellowness index displacement | Laminate plate color difference | |
| Example 16 | Δ | 25 | ○ | ○ | F | 1 | 4 | 0.7 | 3.5 | ○ |
| Example 17 | ○ | 24 | ○ | ○ | F | 1 | 4 | 2.1 | 3.6 | ○ |
| Example 18 | ○ | 26 | ○ | ○ | HB | 1 | 4 | — | — | — |
| Example 19 | ○ | 32 | ○ | ○ | F | 1 | 4 | — | — | — |
| Example 20 | ○ | 32 | ○ | ○ | HB | 1 | 4 | — | — | — |
| Example 21 | ○ | 26 | ○ | ○ | B | 1 | 4 | — | — | — |
| Example 22 | ○ | 22 | ○ | ○ | B | 1 | 4 | — | — | — |
| Example 23 | ○ | 21 | ○ | ○ | B | 1 | 4 | — | — | — |
| Example 24 | ○ | 18 | ○ | ○ | 2B | 1 | 4 | — | — | — |
| Example 25 | ○ | 18 | ○ | ○ | 2B | 1 | 4 | — | — | — |
| Example 26 | ○ | 15 | ○ | ○ | 2B | 1 | 4 | — | — | — |
| Example 27 | ○ | 27 | ○ | ○ | F | 2 | 4 | — | — | — |
| Comparative Example 1 | X | 23 | X | Δ | 2B | 1 | 1 | — | — | — |
| Comparative Example 2 | ○ | 27 | ○ | ○ | H | 3 | 5 | — | — | — |
| Comparative Example 3 | — | — | — | — | — | — | — | — | 37.7 | — |

From the above-described Examples and Production Examples, the following matters were clearly found. The laminate films obtained in Examples 1 to 27 were excellent in adhesiveness with the melamine base material, and in the melamine decorative panels using these laminate films, there was no case where 10 or more sections were peeled off in the adhesiveness evaluation. Further, these melamine decorative panels were excellent in chemical resistance, and a change in appearance of these melamine decorative panels was suppressed even at the time of the coating test. These laminate films and melamine decorative panels have favorable adhesiveness, favorable chemical resistance, and a high industrial utility value. In particular, in Examples 1 to 12 in which the content of the fluororesin as the fluororesin layer (I) is 95% or more, a change in appearance is suppressed even at the time of the acetone test and the industrial utility value is higher. In addition, in Examples 13 to 27 in which the content of fluororesin in the fluororesin layer (I) is less than 95%, curling of the laminate film is suppressed, handleability is favorable, scratch resistance is also excellent since pencil hardness is also high, and the industrial utility value is higher.

On the other hand, in the laminate film obtained in Comparative Example 1, since the content of the monomer unit having a reactive substituent of the resin composition (B10) is less than 4% by mass and the hydroxyl value of the resin composition (B10) is less than 15 mgKOH/g, adhesiveness with the melamine base material was low and 10 or more sections were peeled off in the adhesiveness evaluation. The laminate film was easily peeled off when being used in the melamine decorative panel and it was not possible to obtain a melamine decorative panel with favorable quality. Further, the single-layered acrylic resin film obtained in Comparative Example 2 did not have the fluororesin layer (I) and thus was inferior in chemical resistance.

This application is based upon and claims the benefit of priority to Japanese Patent Application No. 2014-223955, filed Nov. 4, 2014, and the entire contents of their disclosure are incorporated herein by reference.

Hereinbefore, the invention of the present application has been described with reference to the embodiments and examples. However, the invention of the present application is not limited to those embodiments and examples. Various modifications that can be understood by those skilled in the art can be made on configuration and details of the invention of the present application within the scope of the invention of the present application.

The invention claimed is:

1. A laminate film comprising:
   a fluororesin layer (I) which is formed from a fluororesin composition (A); and
   an acrylic resin layer (II) which is formed from a resin composition (B) containing a reactive group-containing acrylic resin (B-1), wherein
   the resin composition (B) contains 10 to 100% by mass of (B-1), 0 to 90% by mass of acrylic rubber particles (B-2) other than (B-1), and 0 to 90% by mass of a thermoplastic resin (B-3) having a mass average molecular weight of less than 400,000 other than (B-1) and (B-2) with respect to the total 100% by mass of (B-1), (B-2), and (B-3), and further contains 0 to 50 parts by mass of an additive (C) other than (B-1), (B-2), and (B-3) with respect to the total 100 parts by mass of (B-1), (B-2), and (B-3),
   a gel fraction of the resin composition (B) is in the range of 10 to 80% by mass,
   the reactive group-containing acrylic resin (B-1) contains a monomer unit having a reactive substituent with respect to an amino group or methylol group, and a content of the monomer unit having the reactive substituent is 4% by mass or more with respect to 100% by mass of the resin composition (B).

2. The laminate film according to claim 1, wherein the reactive substituent is a hydroxyl group.

3. The laminate film according to claim 1, wherein the reactive substituent is a secondary hydroxyl group.

4. A laminate film comprising:
a fluororesin layer (I) which is formed from a fluororesin composition (A); and
an acrylic resin layer (II) which is formed from a resin composition (B) containing a reactive group-containing acrylic resin (B-1), wherein
the resin composition (B) contains 10 to 100% by mass of (B-1), 0 to 90% by mass of acrylic rubber particles (B-2) other than (B-1), and 0 to 90% by mass of a thermoplastic resin (B-3) having a mass average molecular weight of less than 400,000 other than (B-1) and (B-2) with respect to the total 100% by mass of (B-1), (B-2), and (B-3), and further contains 0 to 50 parts by mass of an additive (C) other than (B-1), (B-2), and (B-3) with respect to the total 100 parts by mass of (B-1), (B-2), and (B-3),
a gel fraction of the resin composition (B) is in the range of 10 to 80% by mass,
the reactive group-containing acrylic resin (B-1) contains a monomer unit having a hydroxyl group, and
a hydroxyl value of the resin composition (B) is 15 to 300 mgKOH/g.

5. The laminate film according to claim 1, wherein a glass transition temperature of the reactive group-containing acrylic resin (B-1) is 0 to 90° C.

6. The laminate film according to claim 1, wherein a content of an aromatic vinyl monomer unit in the reactive group-containing acrylic resin (B-1) is 0 to 3% by mass with respect to 100% by mass of the reactive group-containing acrylic resin (B-1).

7. The laminate film according to claim 1, wherein the resin composition (B) contains 10 to 90% by mass of (B-1), 10 to 90% by mass of (B-2), and 0 to 80% by mass of (B-3) with respect to the total 100% by mass of (B-1), (B-2), and (B-3).

8. The laminate film according to claim 1, wherein the additive (C) contains a hindered amine-based stabilizer having a molecular weight of 1,000 or more.

9. The laminate film according to claim 1, wherein the fluororesin composition (A) contains polyvinylidene fluoride.

10. The laminate film according to claim 1, wherein a thickness of the laminate film is 100 μm or less.

11. The laminate film according to claim 1, wherein a thickness of the fluororesin layer (I) is 30 μm or less.

12. The laminate film according to claim 1, wherein a fracture elongation of the laminate film is 5% or more.

13. A method for manufacturing the laminate film according to claim 1, comprising manufacturing the laminate film by a co-extrusion method.

14. A method for manufacturing the laminate film according to claim 1, comprising manufacturing the laminate film by a coating method.

15. A protection film comprising the laminate film according to claim 1.

16. A melamine decorative panel surface protection film comprising the laminate film according to claim 1.

17. A melamine decorative panel comprising the laminate film according to claim 1 and a melamine base material laminated in order of the fluororesin layer (I), the acrylic resin layer (II), and the melamine base material.

18. The laminate film according to claim 4, wherein a glass transition temperature of the reactive group-containing acrylic resin (B-1) is 0 to 90° C.

19. The laminate film according to claim 4, wherein a content of an aromatic vinyl monomer unit in the reactive group-containing acrylic resin (B-1) is 0 to 3% by mass with respect to 100% by mass of the reactive group-containing acrylic resin (B-1).

20. The laminate film according to claim 4, wherein the resin composition (B) contains 10 to 90% by mass of (B-1), 10 to 90% by mass of (B-2), and 0 to 80% by mass of (B-3) with respect to the total 100% by mass of (B-1), (B-2), and (B-3).

21. The laminate film according to claim 4, wherein the additive (C) contains a hindered amine-based stabilizer having a molecular weight of 1,000 or more.

22. The laminate film according to claim 4, wherein the fluororesin composition (A) contains polyvinylidene fluoride.

23. The laminate film according to claim 4, wherein a thickness of the laminate film is 100 μm or less.

24. The laminate film according to claim 4, wherein a thickness of the fluororesin layer (I) is 30 μm or less.

25. The laminate film according to claim 4, wherein a fracture elongation of the laminate film is 5% or more.

26. A method for manufacturing the laminate film according to claim 4, comprising manufacturing the laminate film by a co-extrusion method.

27. A method for manufacturing the laminate film according to claim 4, comprising manufacturing the laminate film by a coating method.

28. A protection film comprising the laminate film according to claim 4.

29. A melamine decorative panel surface protection film comprising the laminate film according to claim 4.

30. A melamine decorative panel comprising the laminate film according to claim 4 and a melamine base material laminated in order of the fluororesin layer (I), the acrylic resin layer (II), and the melamine base material.

* * * * *